(12) United States Patent
Kawashima et al.

(10) Patent No.: US 10,618,408 B2
(45) Date of Patent: Apr. 14, 2020

(54) DISPLAY PANEL

(71) Applicant: NISSHA CO., LTD., Kyoto-shi, Kyoto (JP)

(72) Inventors: Eiji Kawashima, Kyoto (JP); Masaru Terashita, Kyoto (JP); Ryouki Kubomoto, Kyoto (JP); Akihiro Yoshimura, Kyoto (JP); Yusuke Ueno, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 16/480,191

(22) PCT Filed: Jan. 18, 2018

(86) PCT No.: PCT/JP2018/001464
§ 371 (c)(1),
(2) Date: Jul. 23, 2019

(87) PCT Pub. No.: WO2018/168188
PCT Pub. Date: Sep. 20, 2018

(65) Prior Publication Data
US 2019/0381884 A1 Dec. 19, 2019

(30) Foreign Application Priority Data
Mar. 16, 2017 (JP) .................... 2017-051377

(51) Int. Cl.
*B60K 35/00* (2006.01)
*B60R 11/02* (2006.01)
(Continued)

(52) U.S. Cl.
CPC .......... *B60K 35/00* (2013.01); *B60R 11/0235* (2013.01); *B60K 2370/25* (2019.05);
(Continued)

(58) Field of Classification Search
CPC ......... G09F 13/04; G09F 13/08; B29C 45/14; B29C 45/26; B60K 35/00; G06F 3/044; B60R 11/0235
See application file for complete search history.

(56) References Cited

U.S. PATENT DOCUMENTS 7,441,913 B2 * 10/2008 Bayersdorfer ...... F16H 59/0278
362/23.11
9,539,940 B2 * 1/2017 Salter ...................... F16H 63/42
(Continued)

FOREIGN PATENT DOCUMENTS

JP 2007-232473 A 9/2007
JP 2010030053 A 2/2010
(Continued)

OTHER PUBLICATIONS

International Search Report in PCT/JP2018/001464 dated Feb. 20, 2018.

*Primary Examiner* — Zheng Song
(74) *Attorney, Agent, or Firm* — Global IP Counselors, LLP

(57) ABSTRACT

A display panel is attached to an appliance that includes first and second light sources, in which one of the first and second light sources is capable of being turned off when the other is turned on. The display panel basically includes a molded body, a front-side decorative layer, and a sheet-like member. The display panel is capable of individually illuminating a plurality of graphics, which is simultaneously molded and decorated, with light passing through a molded resin. In particular, a first graphic is illuminated in a first window by turning on the first light source, while a first back-side light-shielding region and a second front-side light-shielding region prevent a second graphic from being illuminated. The second graphic is illuminated in a second window by turning on the second light source, while a second back-side light-
(Continued)

shielding region and a first front-side light-shielding region prevent the first graphic from being illuminated.

15 Claims, 23 Drawing Sheets

(51) Int. Cl.
  *B60R 11/00* (2006.01)
  *G06F 3/044* (2006.01)
  *F21W 106/00* (2018.01)
(52) U.S. Cl.
  CPC .. *B60R 2011/0007* (2013.01); *F21W 2106/00* (2018.01); *G06F 3/044* (2013.01)

(56) References Cited

U.S. PATENT DOCUMENTS

| | | | |
|---|---|---|---|
| 2004/0213008 A1* | 10/2004 | Bayersdorfer | B60K 35/00 |
| | | | 362/491 |
| 2012/0099292 A1 | 4/2012 | Yim | |
| 2012/0218097 A1* | 8/2012 | Woo | F16H 63/42 |
| | | | 340/456 |
| 2014/0098516 A1* | 4/2014 | An | G02B 6/0011 |
| | | | 362/23.17 |
| 2015/0329042 A1 | 11/2015 | Araki | |
| 2018/0065547 A1* | 3/2018 | Kirilenko | G09F 13/04 |

FOREIGN PATENT DOCUMENTS

| | | |
|---|---|---|
| JP | 5385248 B2 | 1/2014 |
| JP | 2015-053261 A | 3/2015 |
| WO | 2014087564 A1 | 6/2014 |

\* cited by examiner

DISPLAY PANEL

CROSS REFERENCES TO RELATED APPLICATIONS

This application is a U.S. national stage application of International Application No. PCT/JP2018/001464, filed on Jan. 18, 2018, which claims priority to Japanese Patent Application 2017-051377, filed on Mar. 16, 2017, which is incorporated herein by reference.

TECHNICAL FIELD

The present disclosure relates to a display panel and particularly relates to a display panel attached to an appliance that includes a first light source and a second light source disposed adjacent to each other, one of which can be turned off in a case that the other is turned on.

BACKGROUND

Conventionally, there is a light-guiding decorative resin molded product in which a surface is decorated, light emitted from an internal light source is caused to pass through a resin and to be guided to a specific region of the surface, and the light is caused to be leaked in the specific region to achieve a design effect. For example, Patent Literature 1 (Japanese Patent No. 5385248 B) discloses a light-guiding decorative resin molded product that constitutes an operating panel by integrating a decorative sheet with on a surface of a resin that can transmit light, at the same time in a case that the resin is molded.

SUMMARY

However, only some graphics in the entirety may be illuminated and distinguished from other unilluminated graphics. In a case that an illuminated graphic is switched, a graphic that is not required to be illuminated is also illuminated for a case that light passes through a resin such as the operating panel disclosed in Patent Literature 1, for example. Thus, the configuration disclosed in Patent Literature 1 makes it difficult to switch a graphic illuminated using light having passed through the resin.

An object of the present disclosure is to provide a display panel capable of individually illuminating a plurality of graphics, which are simultaneously molded and decorated, with light passing through a molded resin.

Some aspects are described below as the means to solve the problems. These aspects can be combined optionally, as needed.

A display panel according to an aspect of the present disclosure is attached to an appliance including a first light source and a second light source, one of which is capable of being turned off in a case that the other is turned on and is configured to transmit light emitted from the first light source and the second light source. The display panel includes: a molded body that is light transmissive, is made of resin that is transparent or translucent, and includes a back surface with a protrusion that is a molded body made of the resin; a front-side decorative layer that is simultaneously integrated with a front surface of the molded body in a case that the molded body is molded and that decorates the front surface; and a sheet-like member that is simultaneously integrated with the back surface of the molded body in a case that the molded body is molded. The molded body or the sheet-like member includes a back-side decorative layer including a first graphic configured to be displayed with light from the first light source passing through the first graphic and a second graphic configured to be displayed with light from a second light source passing through the second graphic. The front-side decorative layer includes a first front-side light-shielding region configured to block light passing through a first window and light passing through a periphery of the first window, the first window being configured to allow light passing through the first graphic to pass through; and a second front-side light-shielding region configured to block light passing through a second window and light passing through a periphery of the second window, the second window being configured to allow light passing through the second graphic to pass through. The back-side decorative layer includes a first back-side light-shielding region configured to block light passing through a periphery of the first graphic and a second back-side light-shielding region configured to block light passing through a periphery of the second graphic. The display panel is configured to prevent the second graphic from being illuminated using the first back-side light-shielding region and the second front-side light-shielding region, in a case that the first graphic is illuminated in the first window by the first light source that is turned on, and to prevent the first graphic from being illuminated using the second back-side light-shielding region and the first front-side light-shielding region, in a case that the second graphic is illuminated in the second window by the second light source that is turned on.

The display panel described above may further include a light-shielding member fixed to the back surface of the molded body and configured to block light emitted from the first light source toward the second graphic and light emitted from the second light source toward the first graphic. This configuration enables light emitted from the first light source toward the second graphic and light emitted from the second light source toward the first graphic to be sufficiently blocked.

The light-shielding member described above may include a back-side decorative sheet in which at least one of the first graphic and the second graphic is printed on the sheet-like member. In a case that the light-shielding member is formed using the back-side decorative sheet, the light-shielding member can be formed inexpensively.

In the display panel described above, the molded body may further include a support portion that is a molded body made of resin, protrudes from a back surface of the molded body, and supports a portion of the back side decorative sheet constituting the light-shielding member. A display panel having the configuration described above is less likely to be broken, and thus has high durability.

In the display panel described above, the light-shielding member and/or the front-side decorative layer may include a reflecting portion configured to reflect light emitted from the first light source and/or the second light source at at least a portion of the light-shielding member and/or the front-side decorative layer. In the display panel configured as described above, the first graphic and/or the second graphic can be illuminated to provide more intensity or variation in light representation compared to a case without the reflecting portion.

In the display panel described above, the sheet-like member may include a sensor sheet disposed in a region different from the first graphic and the second graphic and configured to receive input from the front surface of the molded body. This configuration can provide a seamless display panel capable of input using the sensor sheet.

In the display panel described above, the first window and the second window may be disposed such that an angle formed by a straight line connecting the first graphic and an edge of the first window and a normal line with respect to the front surface of the molded body; and an angle formed by a straight line connecting the second graphic and an edge of the second window and the normal line are each greater than a critical angle. The configuration described above enables a viewing angle twice the critical angle to be obtained.

In the display panel described above, the front-side decorative layer may include the first window and the second window that are disposed such that light reaching the first window and the second window from an end of the first back-side light-shielding region, from an end of the second back-side light-shielding region, and from the protrusion, is incident on the front surface of the molded body at an angle greater than the critical angle. The display panel having the configuration described above can prevent the end of the first back-side light-shielding region, the end of the second back-side light-shielding region, and the protrusion from being visible from the first window and the second window so that an aesthetically pleasing appearance can be exhibited.

In the display panel described above, the molded body may include a protrusion or a recess configured to refract light emitted through the first window and/or the second window. The display panel can be configured by using the protrusion or the recess configured to refract light so that the display panel enables a user to easily view a display.

In the display panel described above, the appliance constitutes a center console of an automobile, and the front-side decorative layer may be configured such that a distance from each of the edge of the first window and the edge of the second window to the corresponding one of the end of the first back-side light-shielding region and the end of the second back-side light-shielding region in a plan view is minimum on a rear side in a traveling direction of an automobile. In the display panel configured as described above, a degree of freedom of placement of the first graphic and the second graphic increases to facilitate the placement of the first graphic and the second graphic.

According to the display panel of the present disclosure, a display panel capable of individually illuminating a plurality of graphics of the first graphic and the second graphic, which are simultaneously molded and decorated, with light passing through a molded resin, can be provided.

DETAILED DESCRIPTION

First Embodiment

A display panel according to a first embodiment of the present disclosure will be described with reference to the drawings.

(1) Overview of Display Panel

Figure 1:
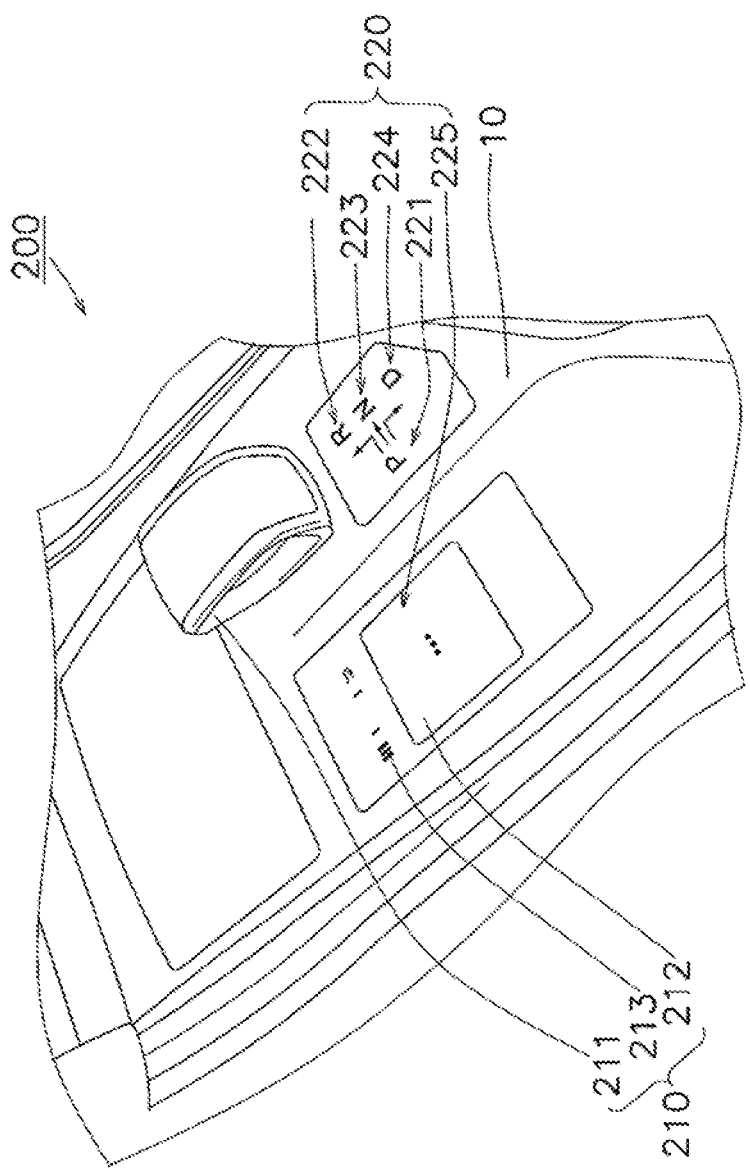
FIG. 1 is a perspective view of a center console in which a display panel according to a first embodiment is used.

FIG. 1 illustrates an example of a display panel attached to a center console of an automobile. In a center console 200 of an automobile, an input device 210 including various types of input devices, a display unit 220 including various types of display units, and the like are disposed.

Examples of the input device 210 include a select lever 211. The select lever 211 is an operating lever of an automatic transmission (not illustrated). The select lever 211 has a plurality of operational positions (ranges). The operational positions include a parking range used during parking, a reversing range used in a case of a reverse motion of an automobile, a neutral range in which the engine is disconnected with the wheels in the transmission, and a drive range used during normal traveling, for example.

Other examples of the input device 210 include a touch pad 212. The touch pad 212 is used in a remote operation in which a navigation device, an audio, and the like are operated on the center console 200 while a screen (not illustrated) visible from a driver's seat is viewed, for example. The touch pad 212 is operated to enable a cursor displayed on a screen to be moved, for example. The touch pad 212 and a touch switch 213 are integrated into a display panel 10 by simultaneous molding and decoration.

Other examples of the input device 210 include the touch switch 213. The touch switch 213 is used in a remote operation in which a navigation device, an audio, and the like are operated on the center console 200 while a screen visible from a driver's seat is viewed, for example. The touch switch 213 is used to enable a menu to be displayed on a screen, input to be finished, and a display screen to be switched, for example.

Examples of the display unit 220 include: a display section 221 for the parking range represented by an initial letter, "P" of the parking range; a display section 222 for the reverse range represented by an initial letter, "R" of the reverse range; a display section 223 for the neutral range represented by an initial letter, "N" of the neutral range; and a display section 224 for the drive range represented by an initial letter. "D" of the drive range.

Other examples of the display unit 220 include a plurality of display portions 225 on which respective illustrations and the like are displayed to indicate a position of each of the touch pad 212 and the touch switch 213.

The display panel 10 is attached to the center console 200. The display panel 10 represents a display content in a decorative manner such that the display content can be visually identified from the front side of the display panel 10.

The display panel 10 may have representation illuminated from the back side of the display panel 10. Various kinds of display of the display unit 220 disposed on the display panel 10 allow various kinds of information to be transmitted from the center console 200 to a driver of the automobile.

The representation in the display panel 10 using illumination includes a representation in which, in a case that the driver shifts the select lever 211 into the neutral range, the character, "N" in the display section 223, is illuminated in green, for example. There is subsequently a representation in which, in a case that the driver operates the select lever 211 to shift it into the drive range from the neutral range, the green light of the character, "N" in the display section 223, is turned off and the character, "D" in the display section 224, is illuminated in white. The driver can recognize that the automatic transmission has switched from a neutral state to a drive state when finding that the character "N" illuminated in green in the display section 223 disappears and the character "D" starts to be illuminated in white in the display section 224. There is also a representation in which the character "R" in the display section 222 is illuminated in orange.

(2) Detailed Configuration of Display Panel 10

Figure 2:
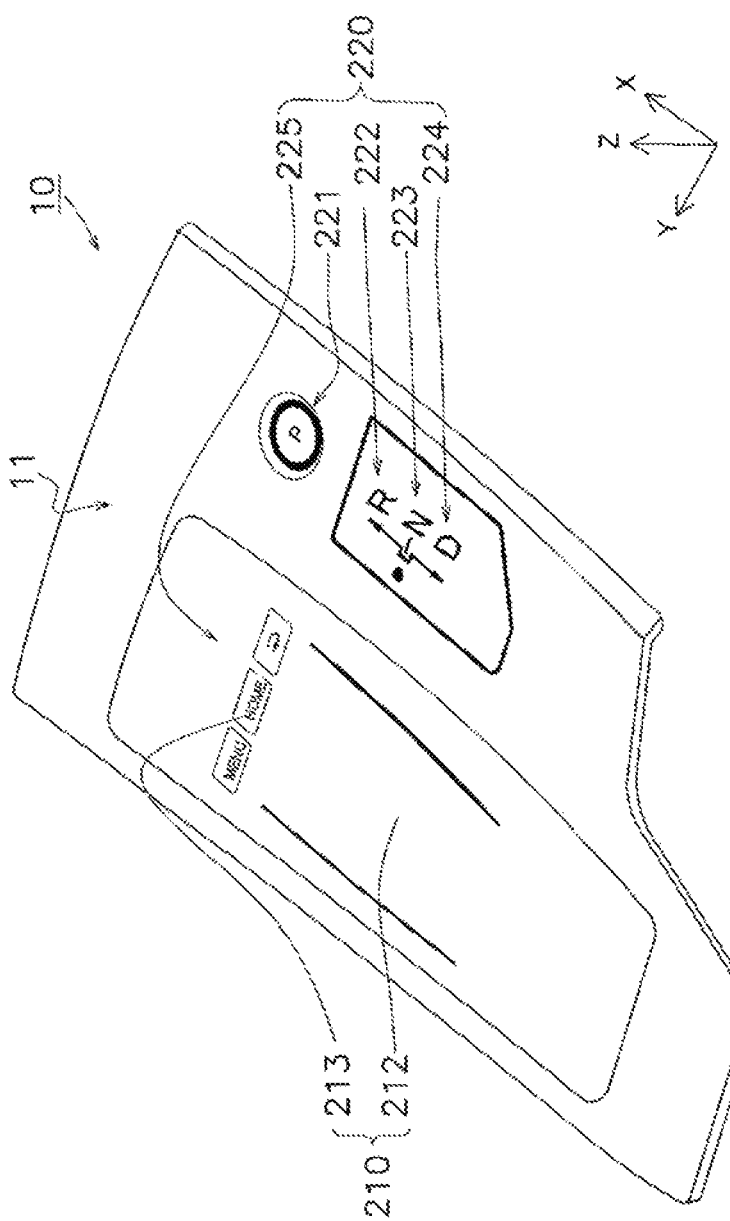
FIG. 2 is a perspective view of a display panel according to the first embodiment as viewed from a front side.
Figure 3:
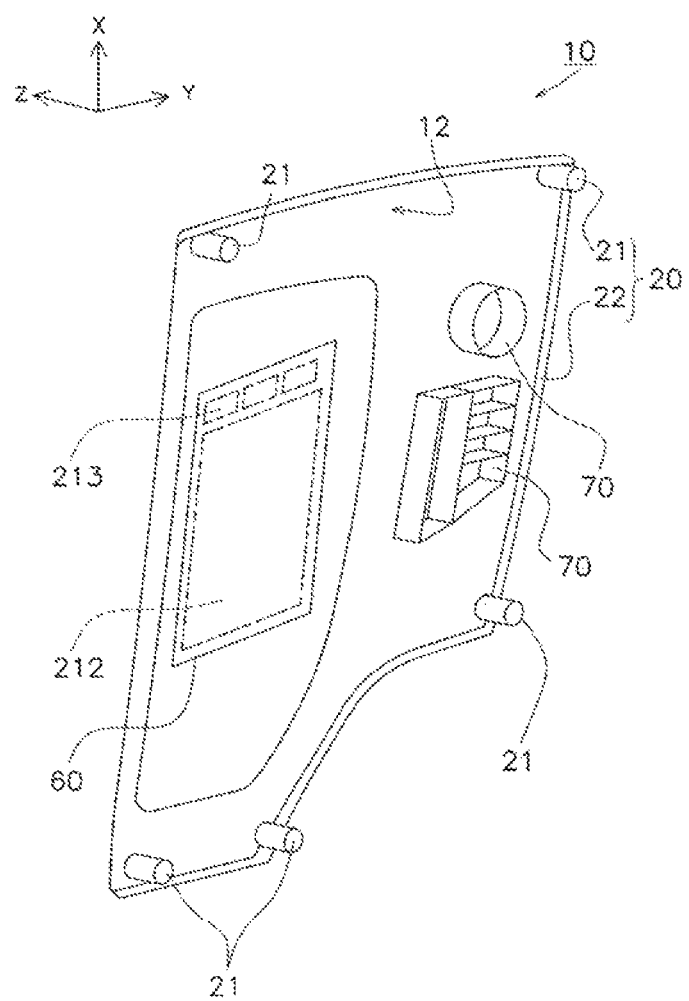
FIG. 3 is a perspective view of a display panel according to the first embodiment as viewed from a back side.

FIGS. 2 and 3 each illustrate the display panel 10 different in shape from the display panel 10 illustrated in FIG. 1. FIG. 2 illustrates an appearance of the display panel 10 as viewed from a front surface 11 side thereof, and FIG. 3 illustrates the appearance of the display panel 10 as viewed from a back surface 12 side thereof. The display panel 10 illustrated in each of FIGS. 2 and 3 also includes the display portions 221 to 225, as with the display panel 10 illustrated in FIG. 1. The display panel 10 illustrated in each of FIGS. 2 and 3 also includes the touch pad 212 and the touch switch 213 that are integrated as in the display panel 10 illustrated in FIG. 1. In the following description, an X-axis direction illustrated in each of FIGS. 2 and 3 is referred to as a front and back direction, a Y-axis direction is referred to as a left and right direction, and a Z-axis direction is referred to as a vertical direction.

The display panel 10 includes a protrusion 20 on its back surface 12. Examples of the protrusion 20 include a boss 21. The boss 21 is used to fix the display panel 10 to the center console 200. Other examples of the protrusion 20 include a rib 22 formed on an edge of the back surface 12 of the display panel 10. The protrusion 20 such as the boss 21 or the rib 22 may cause an increase in degree of difficulty in molding by simultaneous molding and decoration in which the touch pad 212 and the touch switch 213 are integrated with the back surface 12 of the display panel 10 and in which the back surface 12 is decorated.

As described above, a light source for emitting light is disposed on the back surface 12 side of the display panel 10 to illuminate the display panel 10 from its back side. Examples of the light source described above include a plurality of light sources 90 illustrated in FIG. 4. The plurality of light sources 90 include two Light Emitting Diodes (LEDs) 91 and 92. The LEDs 91 and 92 are mounted on a printed circuit board 93 that is one of appliances constituting the center console 200. The LEDs 91 and 92 are configured such that the LED 92 is turned off in a case that the LED 91 is turned on and that the LED 91 is turned off in a case that the LED 92 is turned on.

Figure 4:
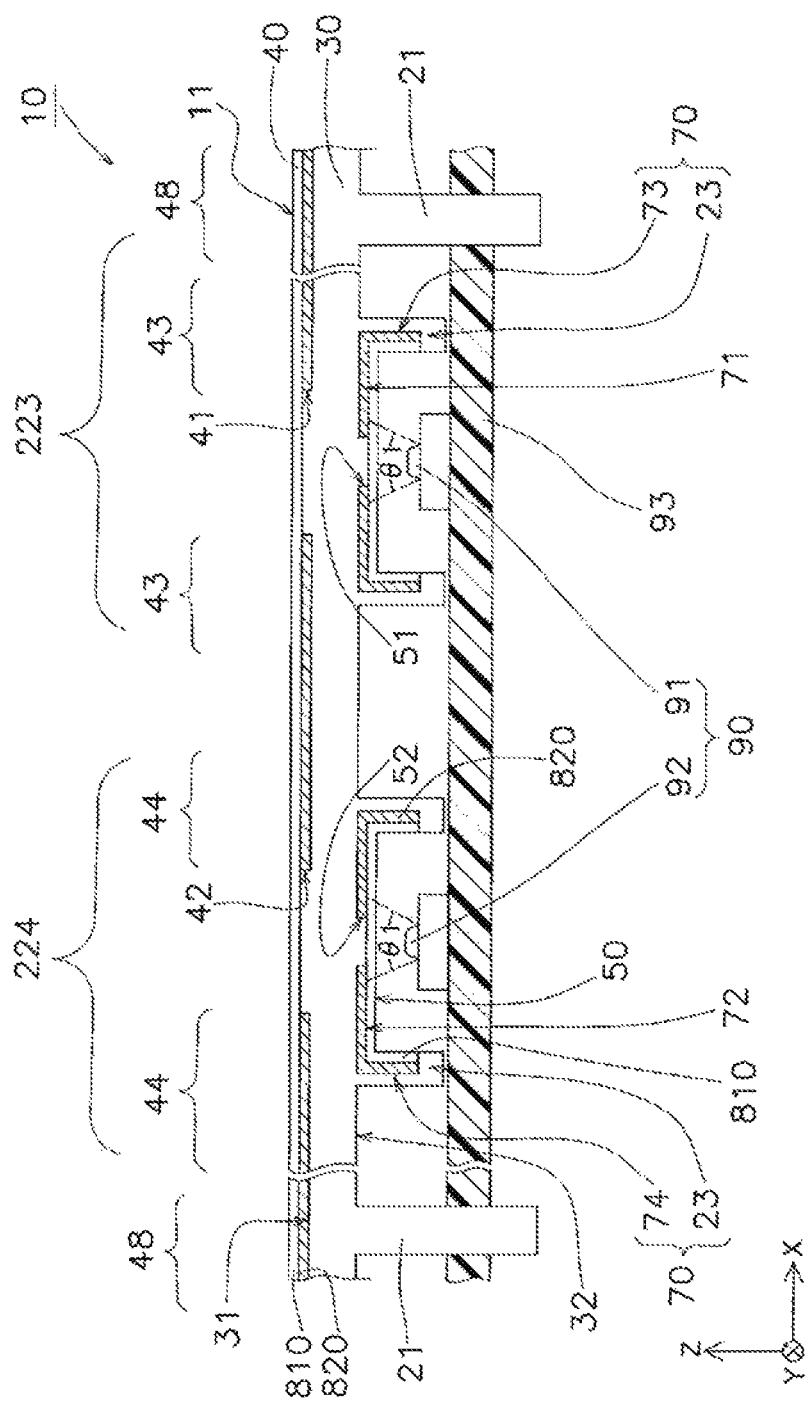
FIG. 4 is a schematic partially enlarged cross-sectional view of a display panel according to the first embodiment.

For example, the boss 21 described above is fitted into the printed circuit board 93 illustrated in FIG. 4. The display panel 10 is directly attached with the boss 21 to the printed circuit board 93 that is the appliance constituting the center console 200, for example. Alternatively, the display panel 10 is attached with the boss 21 to the other appliance constituting the center console 200 together with the printed circuit board 93. The boss 21 is configured to be obscured by a screen region 48 of a front-side decorative sheet 40 and to be invisible from the outside of the display panel 10.

(2-1) Configuration of Display Unit

FIG. 4 schematically illustrates a cross-sectional structure of the display sections 223 and 224 aligned back and forth. The display panel 10 is formed by being molded from a transparent or translucent resin as illustrated in FIGS. 2, 3, and 4. The display panel 10 includes the front-side decorative sheet 40 forming a decorative layer on a front surface 31 of a molded body 30, a back-side decorative sheet 50 for decorating a back surface 32 of the molded body 30, a sensor sheet 60 for forming the touch pad 212 and the touch switch 213 on the back surface 32 of the molded body 30, and a light-shielding member 70.

In a case that the display panel 10 is used attached to the center console 200, and a light of different colors passes through the corresponding two display sections 223 and 224 adjacent to each other, the first LED 91 being the first light source and the second LED 92 being the second light source emit light of the corresponding different colors. The LED 91 for emitting light to the display section 223 for displaying the character "N" emits green light, for example, and the LED 92 for emitting light to the display 224 for displaying the character "D" emits while light, for example.

The back-side decorative sheet 50 includes a first back-side light-shielding region 71, a second back-side light-shielding region 72, a third back-side light-shielding region 73, and a fourth back-side light-shielding region 74. The first back-side light-shielding region 71, the second back-side light-shielding region 72, the third back-side light-shielding region 73, and the fourth back-side light-shielding region 74 block light by absorbing or reflecting light so that each of the regions preferably is black or has a metallic luster, for example. The first back-side light-shielding region 71 extends right and left; and backward and forward, along an XY plane to block excess light emitted from the first LED 91. The second back-side light-shielding region 72 extends right and left; and backward and forward, along an XY plane to block excess light emitted from the second LED 92. The third back-side light-shielding region 73 extends backward and forward and up and down; or up and down and right and left, along an XZ plane; or a YZ plane to block excess light emitted from the first LED 91. In other words, the third back-side light-shielding region 73 surrounds the periphery of the LED 91 in a rectangular shape as viewed from a Z-direction. The fourth back-side light-shielding region 74 extends backward and forward and up and down; or up and down and right and left, along the XZ plane or the YZ plane to block excess light emitted from the second LED 92. In other words, the fourth back-side light-shielding region 74 surrounds the periphery of the LED 92 in a rectangular shape as viewed from the Z direction.

The LEDs 91 and 92 each emit light vertically upward along a Z-axis direction. In FIG. 4, an angle between dot-dash lines represents a ½ beam angle θ1. The ½ beam angle θ1 is formed by lines passing through respective points at which brightness is half brightness in a case that the LEDs 91 and 92 are viewed from the front. The first back-side light-shielding region 71 and the second back-side light-shielding region 72 are each formed extending into a range within the ½ beam angle θ1. Here, the character "N" is a first graphic 51, and the character "D" is a second graphic 52, for example. Thus, the first graphic 51 is located in the range within the ½ beam angle θ1 of the LED 91 and is displayed relatively uniformly. Likewise, the second graphic 52 is located in the range within the ½ beam angle θ1 of the LED 92 and is displayed relatively uniformly. Note that while there is here described the case where each of the graphics is located in the range within the ½ beam angle θ1 of the corresponding one of the LEDs so that the graphic is illuminated uniformly, a part of each of the graphics may be disposed in a range outside the ½ beam angle θ1 to have a different display effect.

The light-shielding member 70 is a portion protruding from the back surface 32 of the molded body 30 to block excess light from the plurality of light sources 90. The light-shielding member 70 includes the third back-side light-shielding region 73 and the fourth back-side light-shielding region 74 of the back-side decorative sheet 50; and resin walls 23, the resin walls 23 each supporting the corresponding one of the third back-side light-shielding region 73 and the fourth back-side light-shielding region 74. In other words, the light-shielding member 70 is formed by combining a part of the molded body 30 and a part of the back-side decorative sheet 50. It is preferable that the entire illuminating angle of each of the LEDs 91 and 92 (in this case, the illuminating angle refers to as an angle at which light is emitted) is covered with the corresponding regions of the first back-side light-shielding region 71, the second back-side light-shielding region 72, the third back-side light-shielding region 73, and the fourth back-side light-shielding region 74.

The front surface 31 of the molded body 30, above the first graphic 51, is provided with a first window 41. The front surface 31 of the molded body 30, above the second graphic 52, is provided with a second window 42. Around the first window 41, a first front-side light-shielding region 43 is formed, and around the second window 42, a second front-side light-shielding region 44 is formed. The first front-side light-shielding region 43 and the second front-side light-shielding region 44 are opaque, for example.

Figure 5A:
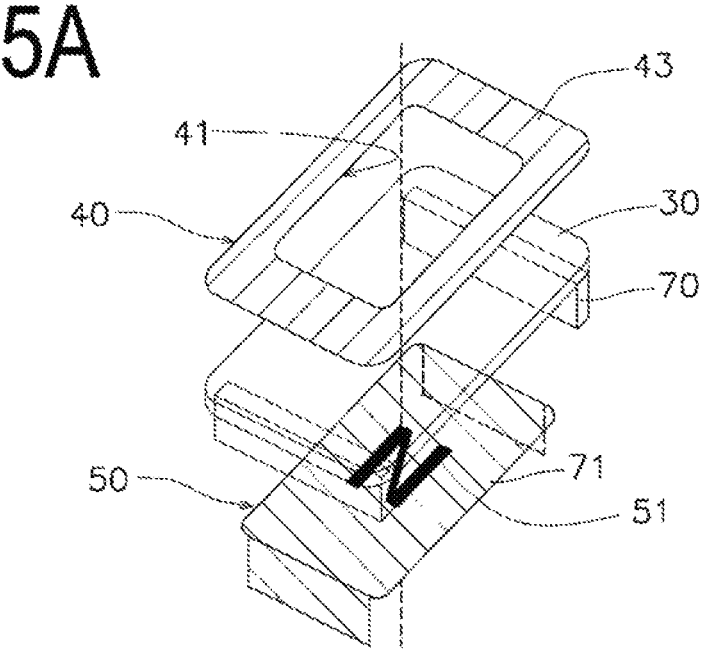
FIG. 5A is an exploded perspective view for illustrating a first graphic and a first window.
Figure 5B:
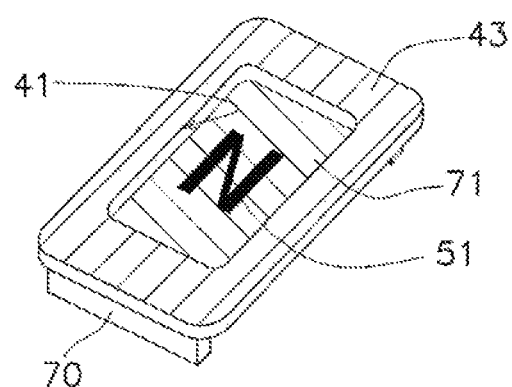
FIG. 5B is a perspective view illustrating a state in which portions illustrated in FIG. 5A are integrally molded.

FIG. 5A illustrates a state in which a portion of each of the first graphic 51 and the first window 41 is disassembled, and FIG. 5B illustrates a state after the portion of each of the first graphic 51 and the first window 41 is molded. The first graphic 51 and the first window 41 are positioned such that light emitted through the first graphic 51 passes through the first window 41. The light-shielding member 70 is formed below the first front-side light-shielding region 43 and is covered with the first front-side light-shielding region 43 to be invisible from the first window 41.

(2-2) Touch Pad 212 and Touch Switch 213

The touch pad 212 and the touch switch 213 are each configured using a capacitive touch sensor, for example. The capacitive touch sensor constituting the touch pad 212 includes a first electrode pattern in a film-like shape that detects a position in a first direction and a second electrode pattern in a film-like shape that detects a position in a second direction. The first electrode pattern is used to form an X-side sensor that detects a position in the X-axis direction, for example. The second electrode pattern is used to form a Y-side sensor that detects a position in a Y-axis direction, for example. The capacitive touch sensor constituting the touch switch 213 includes an electrode that detects a change in capacitance such that on-off information is input, for example.

The touch pad 212 formed as described above enables a two-dimensional input in the XY plane by touching the front surface 11 of the display panel 10 with a fingertip, for example. The touch switch 213 also enables on/off operation by touching the front surface 11 of the display panel 10 with a fingertip, for example.

(2-3) Configuration of Front-Side Decorative Sheet 40 and Back-Side Decorative Sheet 50

The front-side decorative sheet 40 and the back-side decorative sheet 50 each include a film 810 and a graphic layer 820. The film 810 can be made of synthetic resin such as a polyester-based resin, a polypropylene-based resin, an acrylic-based resin, a polycarbonate-based resin, a polyamide-based resin, a polyimide-based resin, an olefin-based resin, a urethane-based resin, or an acrylonitrile butadiene styrene-based resin. The film 810 may be configured as a single-layer sheet or may be configured as a layered sheet formed by layering a plurality of single-layer sheets.

The graphic layer 820 of each of the front-side decorative sheet 40 and the back-side decorative sheet 50 includes a colored ink and a metal thin film, for example, and represents a character, a graphic, a metal luster, and the like. The graphic layer 820 may further include an adhesive layer for improving adhesion between the molded body 30 and the graphic layer 820, a hard coat layer for improving surface strength to impart scratch resistance, and an anchor layer for improving interlayer adhesion. Each of the layers described above can be formed by a printing method, such as a gravure printing method, a screen printing method, or an offset printing method; or a coating method, such as a gravure coating method, a die coating method, a roll coating method, or a comma coating method, for example.

(3) Display by Display Panel 10

(3-1) Overview of Display

It is assumed that before the select lever 211 is operated, the select lever 211 is shifted into the neutral range and the first graphic 51 is illuminated green. While the LED 91 lights up in green at this time, a part of the light emitted from the LED 91 passes through the character, "N" of the first graphic 51, passes through the inside of the molded body 30, and passes through the first window 41 to reach the eyes of a driver, and then the remainder of the light emitted from the LED 91 is blocked by the first back-side light-shielding region 71 and the third back-side light-shielding region 73. While this causes the character, "N" of the first graphic 51, to emerge green, the character, "D" of the second graphic 52, does not shine because the green light does not reach the second graphic 52 adjacent to the first graphic 51. As a result, the driver can be prevented from misunderstanding that the select lever 211 is shifted into the drive range.

In a case that the select lever 211 is operated to be switched from the neutral range to the drive range, the LED 91 turns off and the LED 92 turns on. Thus, while the LED 92 lights up in white, a part of the light emitted from the LED 92 passes through the character, "D" of the second graphic 52, passes through the inside of the molded body 30, and passes through the second window 42 to reach the eyes of the driver, and then the remainder of the light emitted from the LED 92 is blocked by the second back-side light-shielding region 72 and the fourth back-side light-shielding region 74. While this causes the character, "D" of the second graphic 52, to emerge white, the character, "N" of the first graphic 51, does not shine because the white light does not reach the first graphic 51 adjacent to the second graphic 52. As a result, the driver can be prevented from misunderstanding that the select lever 211 is shifted into the neutral range.

(3-2) Viewing Angle of Display Panel 10

Figure 6A:
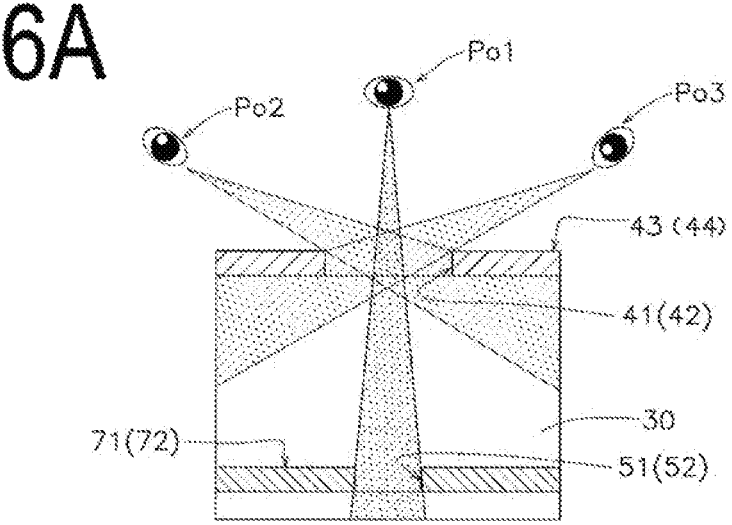
FIG. 6A is a schematic partially enlarged cross-sectional view of a display panel for illustrating a state in which a first graphic or a second graphic is invisible in a relationship with viewing angles.
Figure 6B:
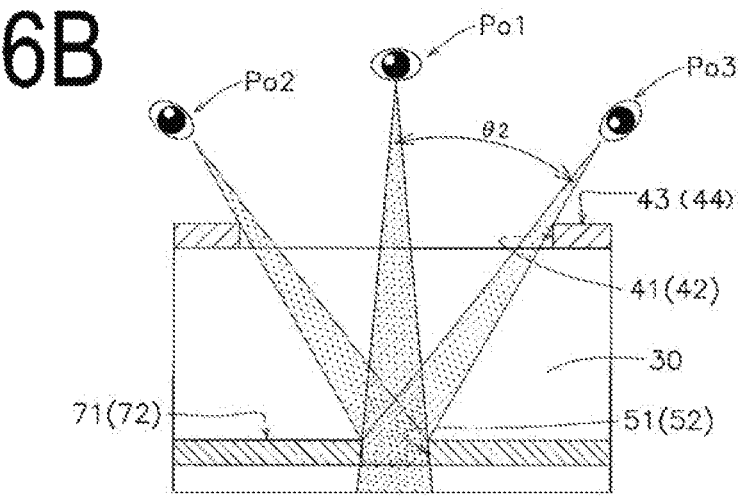
FIG. 6B is a schematic partially enlarged cross-sectional view of a display panel for illustrating a state in which the first graphic or the second graphic is visible in a relationship with viewing angles.
Figure 7:
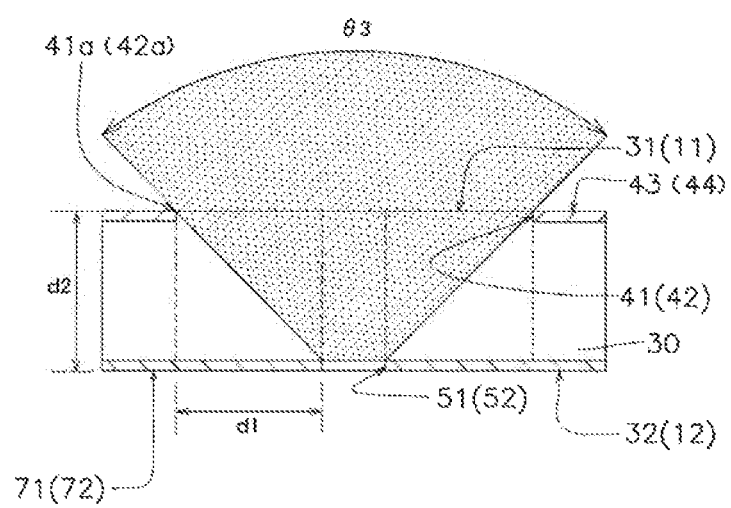
FIG. 7 is a partially enlarged cross-sectional view of a display panel for illustrating placement of a first window and a second window.

The display panel 10 is configured such that both of the front surface 31 and the back surface 32 of the molded body 30 are provided with the first front-side light-shielding region 43 and the second front-side light-shielding region 44, and the first back-side light-shielding region 71 and the second back-side light-shielding region 72, respectively, which greatly limits an viewing angle. The viewing angle will be described with reference to FIGS. 6A and 6B schematically illustrating the first graphic 51 (or the second graphic 52); and FIG. 7 schematically illustrating the first graphic 51 (or second graphic 52). FIG. 6A illustrates a position where the first graphic 51 is invisible due to the viewing angle. Thus, a method for allowing the first graphic 51 to be visible from a position at which the first graphic 51 is invisible in FIG. 6A will be described with reference to FIG. 6B.

In each of FIGS. 6A and 6B, a position Po1 is vertically above the first graphic 51 (or second graphic 52) in an illumination direction of the LED 91, and each of positions Po2 and Po3 is on a line inclined from a vertical direction of the first graphic 51 by an angle θ2. In the display panel 10 having the configuration of FIG. 6A, light having passed through the first graphic 51 is blocked by the first front-side light-shielding region 43 (or the second front-side light-shielding region 44) so that the first graphic 51 is invisible at the positions Po2 and Po3. To allow the first graphic 51 to be visible at the positions Po2 and Po3, the first window 41 (or second window 42) is enlarged to increase the viewing angle to greater than 2×θ2 as illustrated in FIG. 6B.

In a case that the front surface 31 and the back surface 32 of the molded body 30 are parallel at any place in the first window 41 (or the second window 42) as illustrated in FIG. 7, the first window 41 is disposed having an edge 41a away from the first graphic 51 by a distance d1 in a plan view, the distance d1 being equal to or greater than a value acquired by the expression, d2×tan (θ3/2), determined from a thickness d2 of the molded body 30 at a placement position of the first window 41, to obtain a viewing angle θ3 twice the critical angle for the first graphic 51. Likewise, to obtain the viewing angle θ3 also for the second graphic 52, the second window 42 is disposed having an edge 42a away from the second graphic 52 by the distance d1 in a plan view, the distance d1 being equal to or greater than a value acquired by the expression, d2×tan (θ3/2), determined from the thickness d2 of the molded body 30 at a placement position of the second window 42.

In a case that it is assumed that the viewing angle θ3 coincides with twice the critical angle, light traveling on the outermost side of the viewing angle is incident on the front surface 31 at the critical angle because the front surface 31 and the back surface 32 are parallel. Light of the LED 91 incident on the front surface 31 at an angle greater than the critical angle is reflected at the front surface 31 and is invisible from outside the display panel 10. Thus, even in a case where the first window 41 is enlarged so that the light of the LED 91 is incident into the first window 41 at an angle of incidence greater than the critical angle, the light is reflected, and thus the viewing angle does not increase. Conversely, in a case that the first window 41 is narrowed to block light of the LED 91 incident at an angle of incidence less than the critical angle, the viewing angle decreases. That is, in a case that the first window 41 is disposed to satisfy the relationship, d1≥d2×tan (θ 3/2), the maximum viewing angle in the display panel 10 can be obtained.

Next, a method of further increasing the viewing angle and a method for changing a traveling direction of light will be described with reference to FIGS. 8A to 8D.

In a case that the graphic is a character, it is preferable to consider distortion of the character, and this causes difficult description. Thus, a method will be described for allowing a bright point 53 to be easily visible, the bright point 53 being not required to account for distortion. Here, the bright point 53 is also described as being included in the first graphic 51.

Figure 8A:
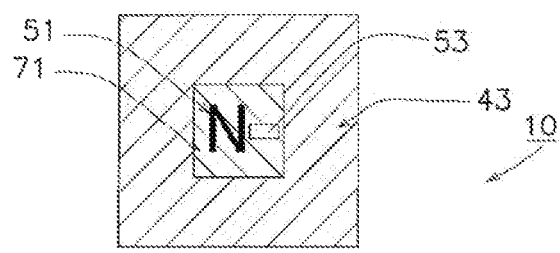
FIG. 8A is a partially enlarged plan view enlarging a periphery of a first window.
Figure 8B:
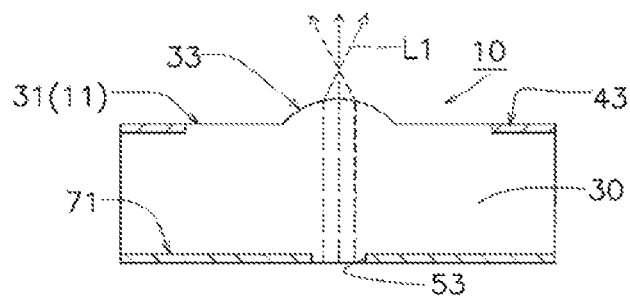
FIG. 8B is a partially enlarged cross-sectional view of a periphery of the first window for illustrating a convex surface.

The display panel 10 illustrated in FIG. 8B includes a convex surface 33 that is formed on the molded body 30 at a position in the first window 41. The display panel 10 illustrated in FIG. 8C includes a concave surface 34 that is formed in the molded body 30 at a position in the first window 41. The display panel 10 illustrated in FIG. 8D includes an inclined surface 35 that is formed on the molded body 30 at a position in the first window 41. The convex surface 33, the concave surface 34, and the inclined surface 35 each act to refract light passing through the molded body 30. The convex surface 33, the concave surface 34, and the inclined surface 35 each can be accurately formed at a position in the first window 41 and at a position corresponding to the first graphic 51 by injection molding of the molded body 30 and integral molding of the front-side decorative sheet 40 and the back-side decorative sheet 50.

Figure 8C:
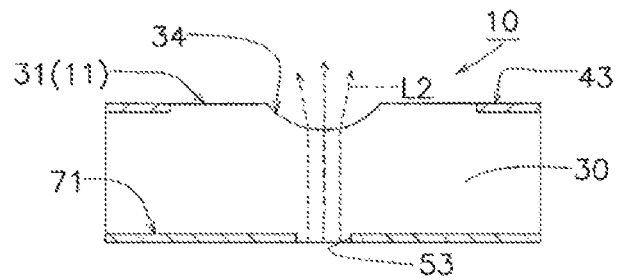
FIG. 8C is a partially enlarged cross-sectional view of the periphery of the first window for illustrating a concave surface.
Figure 8D:
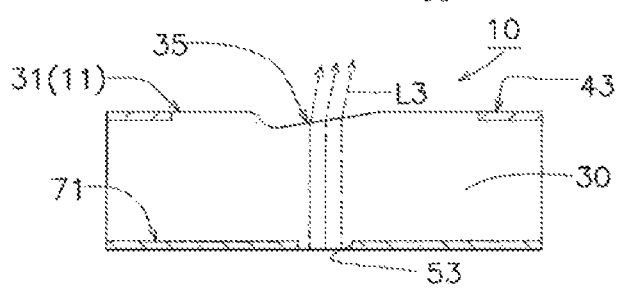
FIG. 8D is a partially enlarged cross-sectional view enlarging the periphery of the first window for illustrating an inclined surface.

In FIGS. 8B to 8D, light along each of the optical paths L1, L2, and L3 is drawn to be parallel light until entering the air for ease of illustration. The light along the optical path L1 travels to spread entirely after being refracted and focused upon entering the air from the convex surface 33. The light along the optical path L2 travels to spread entirely upon entering the air from the concave surface 34. In a case that the light along each of the optical paths L1 and L2 spreads entirely, a viewing angle increases compared to a case that the parallel light still travels. This causes a driver of an automobile to easily recognize the bright point 53. In addition, the light along the optical path L3 travels along another optical path upon entering the air from the inclined surface 35. In a case that the driver is positioned in a direction in which the light path L3 bends, the driver can easily recognize the bright point 53. While FIG. 8D illustrates the inclined surface 35 that is formed by being recessed from the front surface 31 of the molded body 30, the inclined surface may be formed by protruding from the front surface 31. In addition, asperities such as the convex surface 33, the concave surface 34, and the inclined surface 35 formed on the front surface 11 of the display panel 10 may be a clue to recognize positions of the touch pad 212, the touch switch 213, and the like, for a person like a driver who cannot gaze at only the center console 200 during driving.

(3-3) Obscuring Structure of Display Panel 10

In a case that structures such as the protrusion 20 and the light-shielding member 70 of the display panel 10 are visible from the front surface 11 of the display panel 10, the product value of the display panel 10 may be impaired. Thus, the display panel 10 is configured such that the structures such as the protrusion 20 and the light-shielding member 70 are obscured by the front-side decorative sheet 40. Obscuring using the front-side decorative sheet 40 will be described with reference to FIGS. 9A, 9B, and 10A.

Figure 9A:
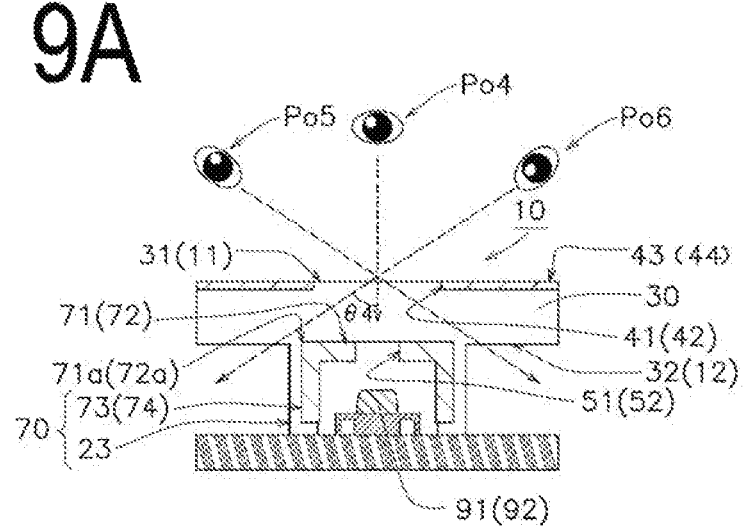
FIG. 9A is a schematic partially enlarged cross-sectional view of a display panel for illustrating a state in which structure on a back side of the display panel is visible.
Figure 9B:
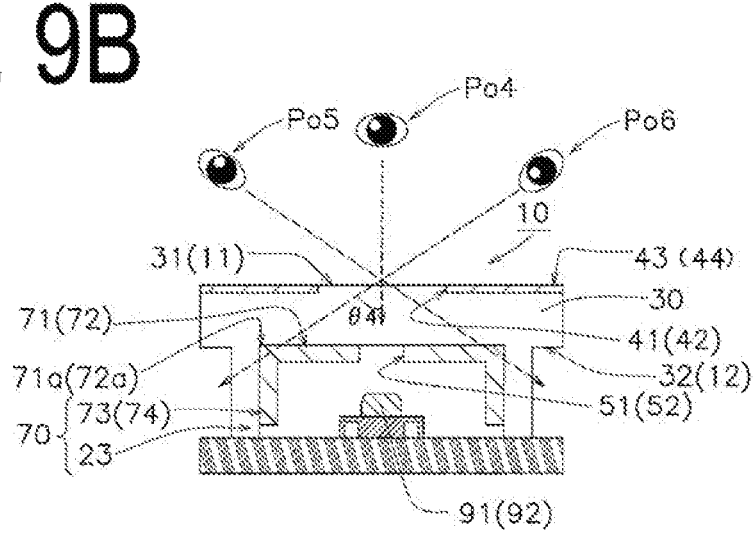
FIG. 9B is a schematic partially enlarged cross-sectional view of the display panel for illustrating a state in which the structure on the back side of the display panel is invisible.

As illustrated in FIGS. 9A and 9B, the display panel 10 is configured such that the molded body 30 is provided on the back surface 32 with the first back-side light-shielding region 71 and the second back-side light-shielding region 72 that have ends 71a and 72a, respectively. FIG. 9A illustrates positions at which the corresponding ends 71a and 72a are visible. Then, a method will be described for allowing the ends 71a and 72a to be invisible from the positions at which the corresponding ends 71a and 72a are visible in FIG. 9A, with reference to FIG. 9B.

In each of FIGS. 9A and 9B, a position Po4 is vertically above the first graphic 51 (or second graphic 52) in an illumination direction of the LED 91 (or 92), and each of positions Po5 and Po6 is on a line inclined from a vertical direction of the first graphic 51 by an angle θ4. In the display panel 10 having the configuration illustrated in FIG. 9A, light having emerged from the end 71a of the first back-side light-shielding region 71 (or the end 72a of the second back-side light-shielding region 72) is incident into the first window 41 (or the second window 42) at an angle equal to or less than the critical angle θ4. As a result, the light having emerged from the end 71a of the first back-side light-shielding region 71 (or the end 72a of the second back-side light-shielding region 72) reaches corresponding one of the positions Po5 and Po6 so that the end 71a of the first back-side light-shielding region 71 (or the end 72a of the second back-side light-shielding region 72) is visible at the corresponding one of the positions Po5 and Po6. To prevent the structure from being visible at the positions Po5 and Po6, the first back-side light-shielding region 71 is provided with the end 71a (or the second back-side light-shielding region 72 is provided with the end 72a) away from the first window 41 (or the second window 42) as illustrated in FIG. 9B to increase an angle of incidence of light emerged from the end 71a of the first back-side light-shielding region 71 (or the end 72a of the second back-side light-shielding region 72) to greater than the critical angle θ4.

Figure 10A:
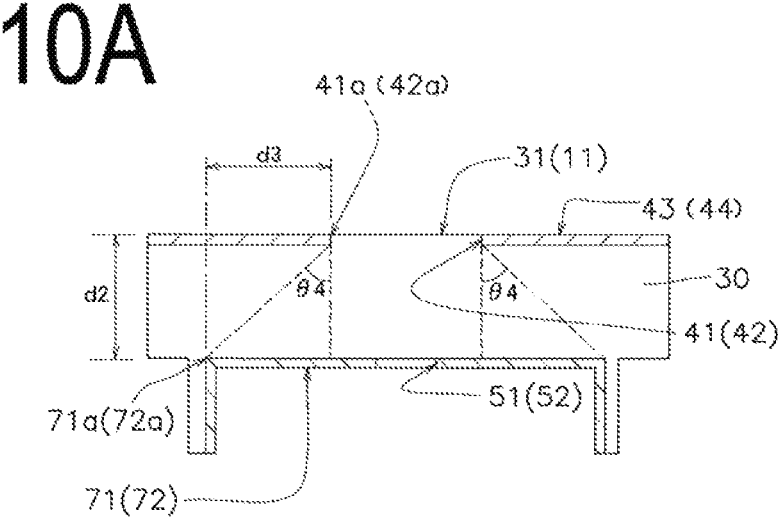
FIG. 10A is a partially enlarged cross-sectional view of a display panel for illustrating placement of a first window and a second window.

In a case that the front surface 31 of the molded body 30 is planar as illustrated in FIG. 10A, the relationship, tan θ4=d3/d2, is satisfied in a case that light having emerged from the end 71a of the first back-side light-shielding region 71 (or the end 72a of the second back-side light-shielding region 72) reaches the edge 41a (42a) of the first window 41 (or the second window 42) at an angle of incidence that coincides with the critical angle. Thus, to increase the angle of incidence to the first window 41 (or the second window 42) to greater than the critical angle θ4, a distance from the edge 41a (42a) of the first window 41 (or second window 42) to the end 71a of the first back-side light-shielding region 71 (or the end 72a of the second back-side light-shielding region 72) needs to be greater than a distance d3 (=d2×tan θ4). The front surface 31 of the molded body 30 may be a curved surface, and in this case, an angle of incidence with respect to the curved surface is given by an angle with respect to a normal line standing on the curved surface.

As described above, to allow the structure on the back side of the display panel 10 to be invisible, the structure on the back side tends to increase in size. In the display panel 10 used in the center console 200 of an automobile, the display panel 10 is not viewed from the front in a traveling direction of the automobile. Thus, a rearward structure in the traveling direction of the automobile may be left visible from the front. In other words, the front-side decorative sheet 40 may be configured such that for a distance between each of the edges 41a and 42a of the first window 41 and the second window 42; and the corresponding one of the end 71a of the first back-side light-shielding region 71 and the end 72a of the second back-side light-shielding region 72 in a plan view, a distance d4 rearward in the traveling direction of the automobile is set to be minimum.

(4) Manufacturing Method of Display Panel 10

Figure 11A:
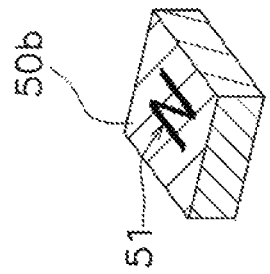
FIG. 11A is a partially enlarged plan view illustrating a portion of a back-side decorative sheet.
Figure 11B:
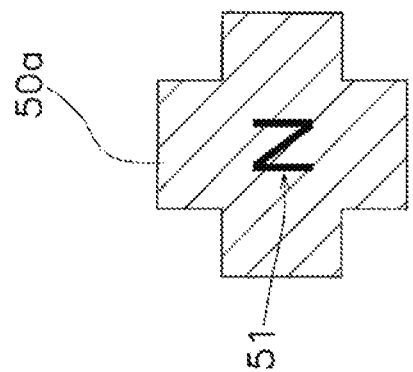
FIG. 11B is a partially enlarged plan view illustrating a film piece obtained by trimming.
Figure 11C:
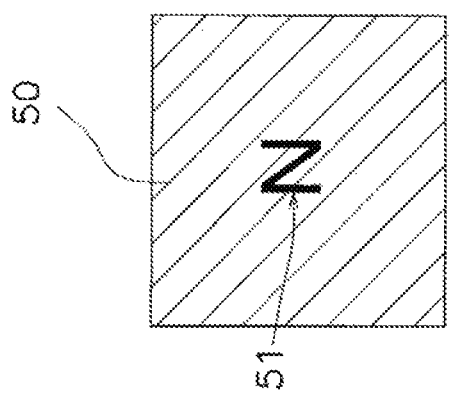
FIG. 11C is a perspective view illustrating an insert piece obtained by forming.

A manufacturing method of the display panel 10 will be described with reference to FIGS. 11A to 11C, 12, and 13. First, the back-side decorative sheet 50 is prepared as illustrated in FIG. 11A. On the back-side decorative sheet 50, the first graphic 51 representing the character "N" is printed. FIG. 11A illustrates a part of the back-side decorative sheet 50, and the characters, "D", "R", and the like, which are not illustrated, are printed on the back-side decorative sheet 50 prepared. FIG. 11B illustrates a film piece 50a that is trimmed in a cruciform shape in a plan view such that the character "N" is disposed at the center. The film piece 50a illustrated in FIG. 11B is formed to obtain an insert piece 50b illustrated in FIG. 11C. Likewise, portions in which the characters of "D" and "R" are printed are also formed into insert pieces by trimming and forming.

Figure 12:
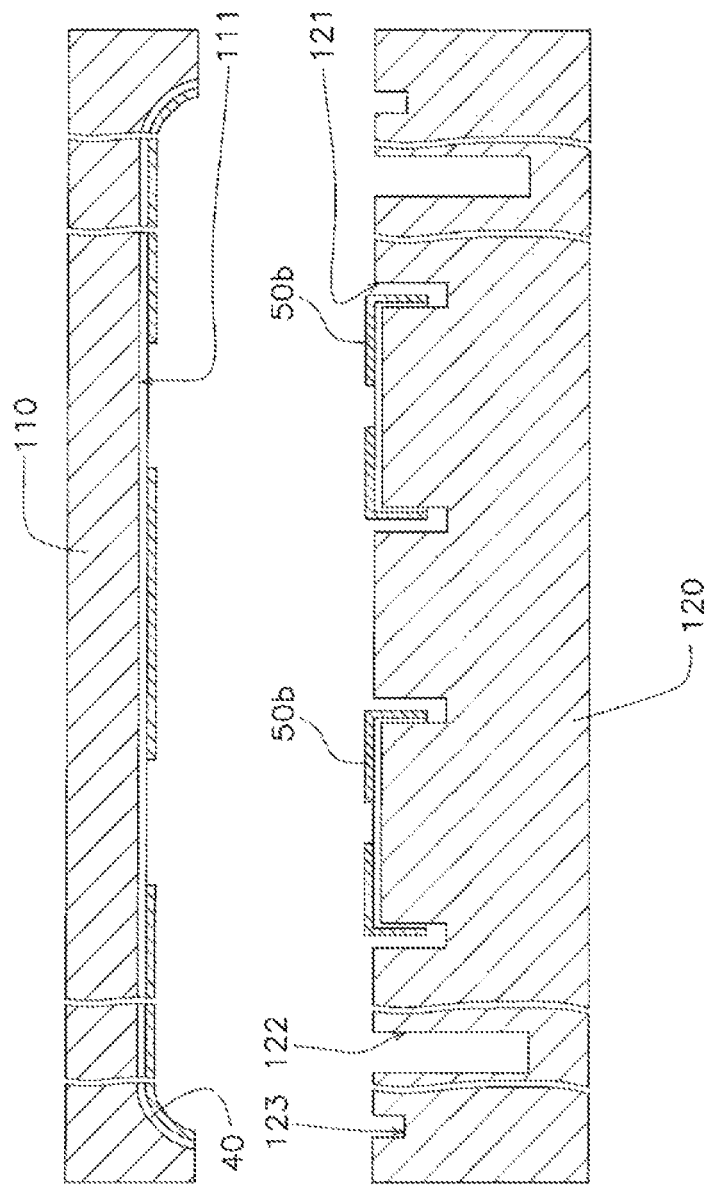
FIG. 12 is a cross-sectional view schematically illustrating a first mold and a second mold before being clamped.
Figure 13:
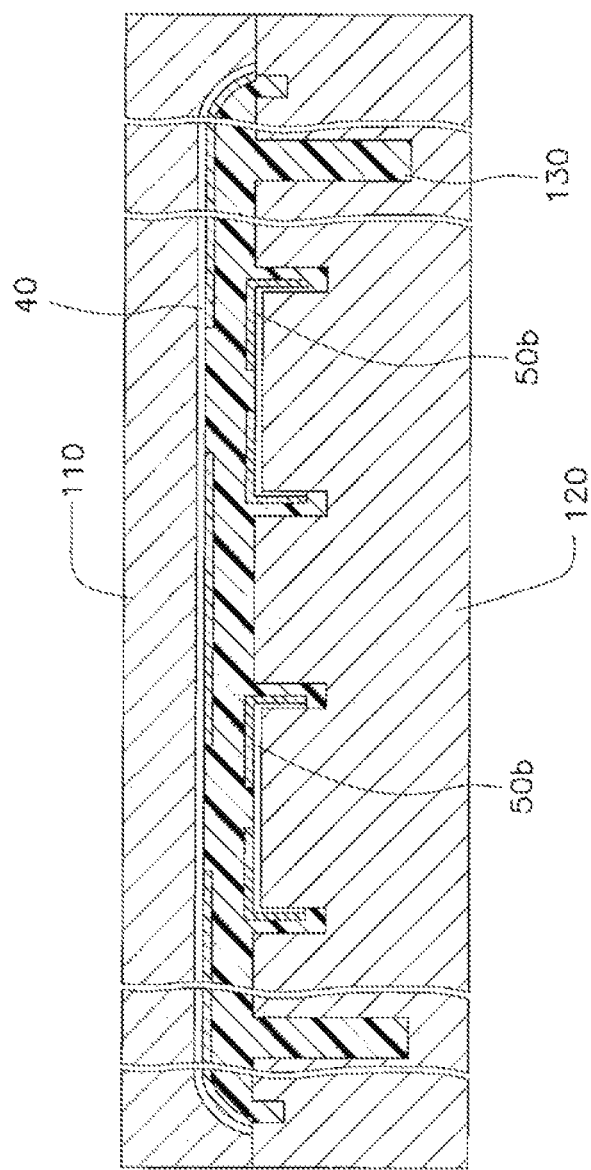
FIG. 13 is a cross-sectional view schematically illustrating a first mold and a second mold after molten resin is injected.

The display panel 10 is manufactured using a first mold 110 and a second mold 120. FIGS. 12 and 13 each schematically illustrate a cross-section of the first mold 110 and the second mold 120 that are set in a molding machine (not illustrated). FIGS. 12 and 13 each illustrate each member that is deformed to allow each member to be easily viewed in the drawings.

FIG. 12 illustrates a step of disposing each of the front-side decorative sheet 40, the back-side decorative sheet 50, and the sensor sheet 60 (not illustrated) in the corresponding one of the first mold 110 and the second mold 120. The front-side decorative sheet 40 is disposed along an inner surface 111 of the first mold 110. The front-side decorative sheet 40 is disposed along the inner surface 111 by sucking air between the front-side decorative sheet 40 and the inner surface 111 of the first mold 110, for example. The second mold 120 includes a cavity 121 into which the insert piece 50b is fitted. While an illustration is omitted, the sensor sheet 60 (refer to FIG. 3) is also disposed in the second mold 120. The insert piece 50b and the sensor sheet 60 are positioned at respective specific positions in the second mold 120. The insert piece 50b and the sensor sheet 60 are fixed in position by suction as with the front-side decorative sheet 40, for example. The front-side decorative sheet 40 is also positioned at a specific position in the first mold 110. Then, a mutual positional relationship between the first mold 110 and the second mold 120 is fixed using a positioning pin (not illustrated). Thus, in a case that the first mold 110 and the second mold 120 are clamped while being positioned by the positioning pin, a mutual positional relationship among the first mold 110, the second mold 120, the front-side decorative sheet 40, the insert piece 50b, and the sensor sheet 60, is accurately maintained.

In an injection step, a molten resin 130 is injected into a space formed by the clamping between the first mold 110 and the second mold 120, where the front-side decorative sheet 40, the insert piece 50b, and the sensor sheet 60 are disposed. The molten resin 130 enters a hole 122 and a groove 123 of the second mold 120 to form the boss 21 and the rib 22, respectively. The molten resin injected into the space between the first mold 110 and the second mold 120 is cured to form the molded body 30 illustrated in FIGS. 2 to 5. After injection molding, the first mold 110 and the second mold 120 are opened, and a resin molded product with a gate resin (not illustrated) or the like is removed. The gate resin or the like is cut off from the removed resin molded product to obtain the display panel 10.

(5) Modification (5-1) Modification 1A

In the first embodiment described above, there is described the case where the light-shielding member 70 is formed by combining a resin wall 23 of the molded body 30; and the third back-side light-shielding region 73 and the fourth back-side light-shielding region 74 of the back-side decorative sheet 50.

Figure 14:
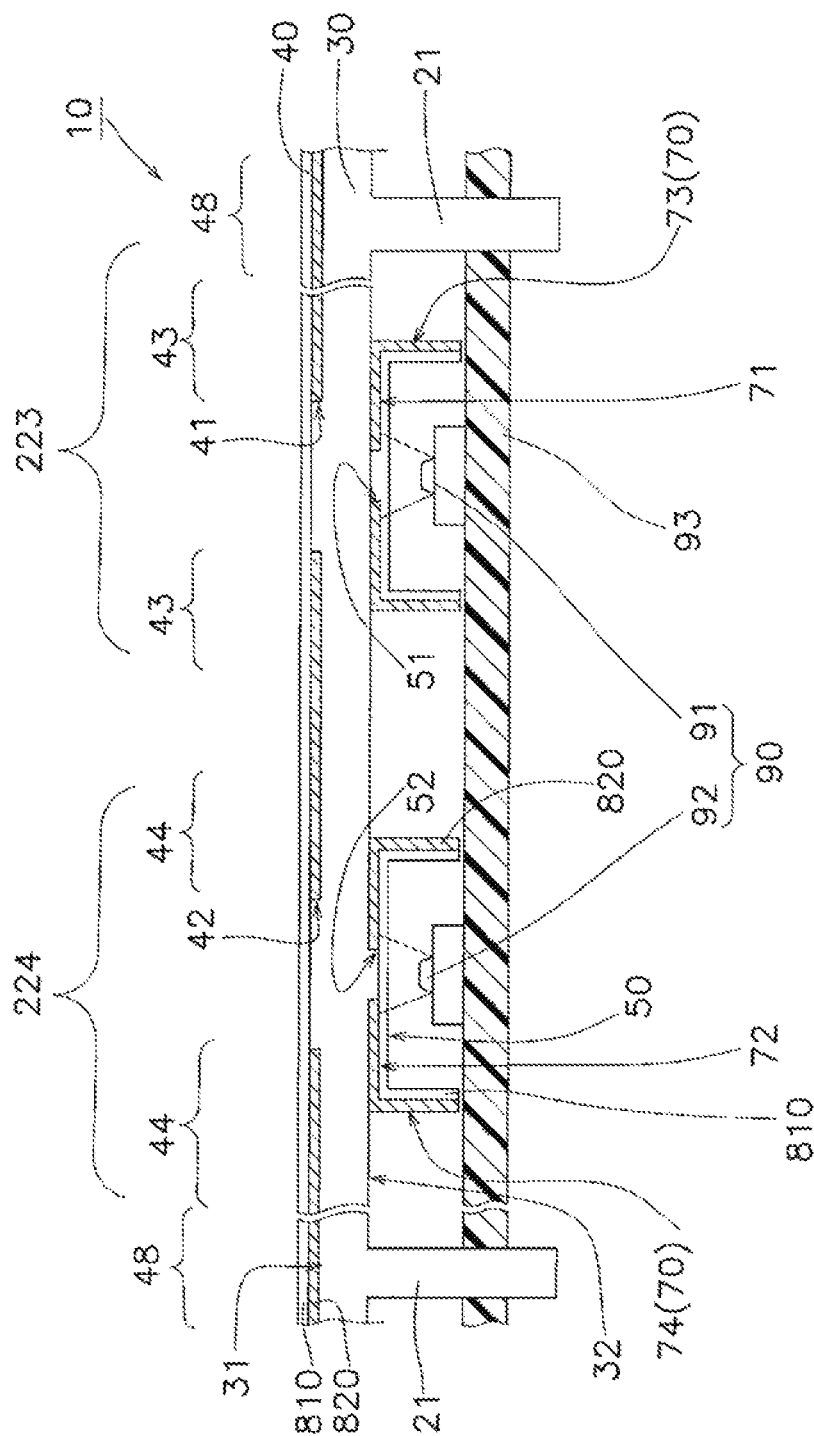
FIG. 14 is a schematic partially enlarged cross-sectional view illustrating an example of a display panel according to a modification 1A.

However, as illustrated in FIG. 14, the resin wall 23 of the molded body 30 may be eliminated to form the light-shielding member 70 using the third back-side light-shielding region 73 and the fourth back-side light-shielding region 74 of the back-side decorative sheet 50.

Figure 15:
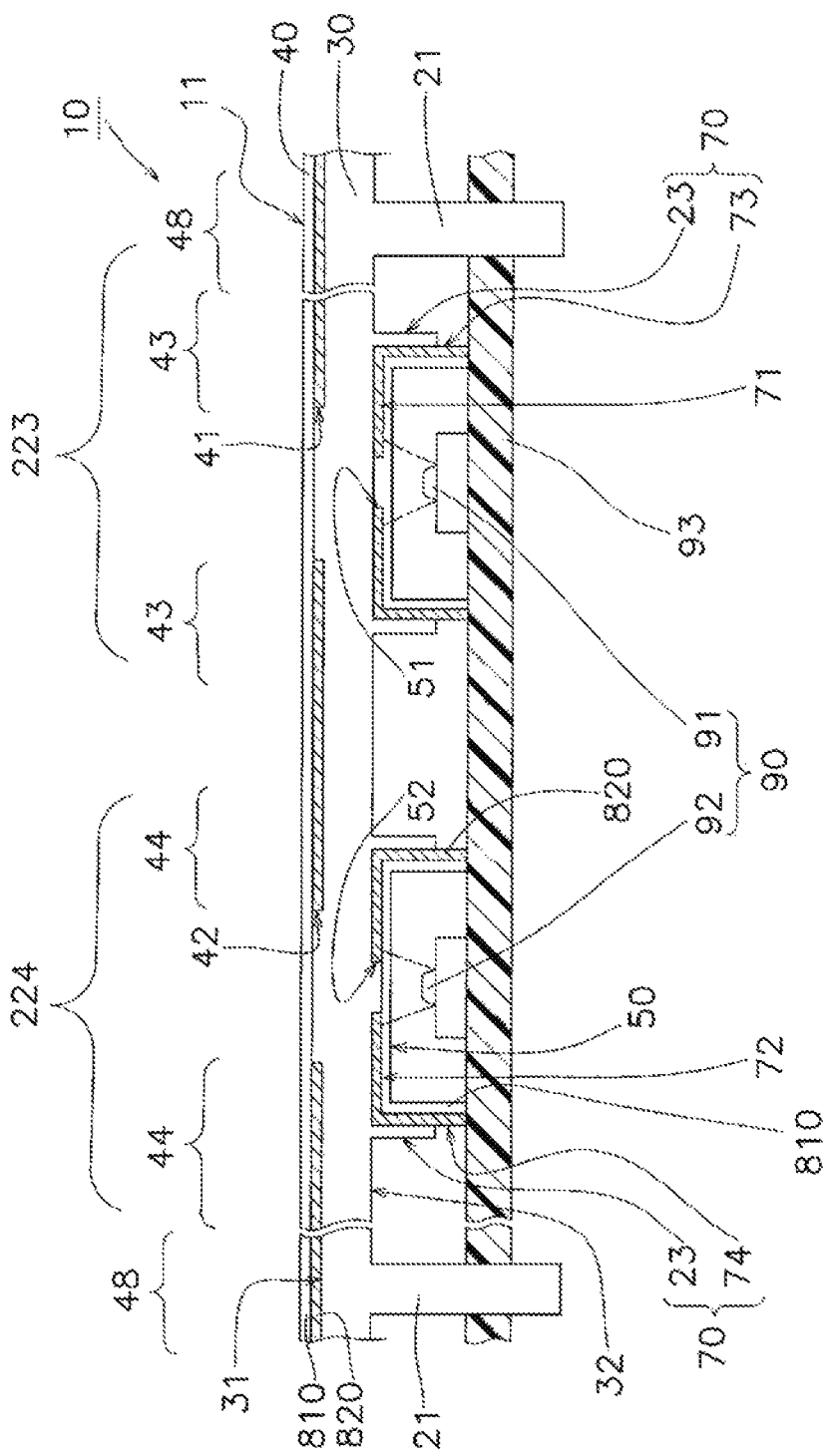
FIG. 15 is a schematic partially enlarged cross-sectional view illustrating another example of a display panel according to the modification 1A.

As illustrated in FIG. 15, a part of the back-side decorative sheet 50 may be supported by the resin wall 23 of the molded body 30, and the third back-side light-shielding region 73 and the fourth back-side light-shielding region 74 of the back-side decorative sheet 50 may each include portions not supported by the resin wall 23.

The back-side decorative sheet 50 is formed of a film that is likely to be elastically deformed so that the back-side decorative sheet 50 can be extended to a portion in contact with the printed circuit board 93 even in a case that there are asperities such as wires on a surface of the printed circuit board 93. In a case that the light-shielding member 70 is extended to the portion in contact with the printed circuit board 93 or near the printed circuit board 93, light is more completely blocked by the light-shielding member 70.

(5-2) Modification 1B

While there is described the case where the light-shielding member 70 is used in the first embodiment described above, there may be available a configuration even without the light-shielding member 70, in which the second graphic 52 is prevented from being illuminated by the first back-side light-shielding region 71 and the second front-side light-shielding region 44 in a case that the first graphic 51 is illuminated in the first window 41 by the LED 91 that is turned on and in which the first graphic 51 is prevented from being illuminated by the second back-side light-shielding region 72 and the first front-side light-shielding region 43 in a case that the second graphic 52 is illuminated in the second window 42 by the LED 92 that is turned on.

Figure 16:
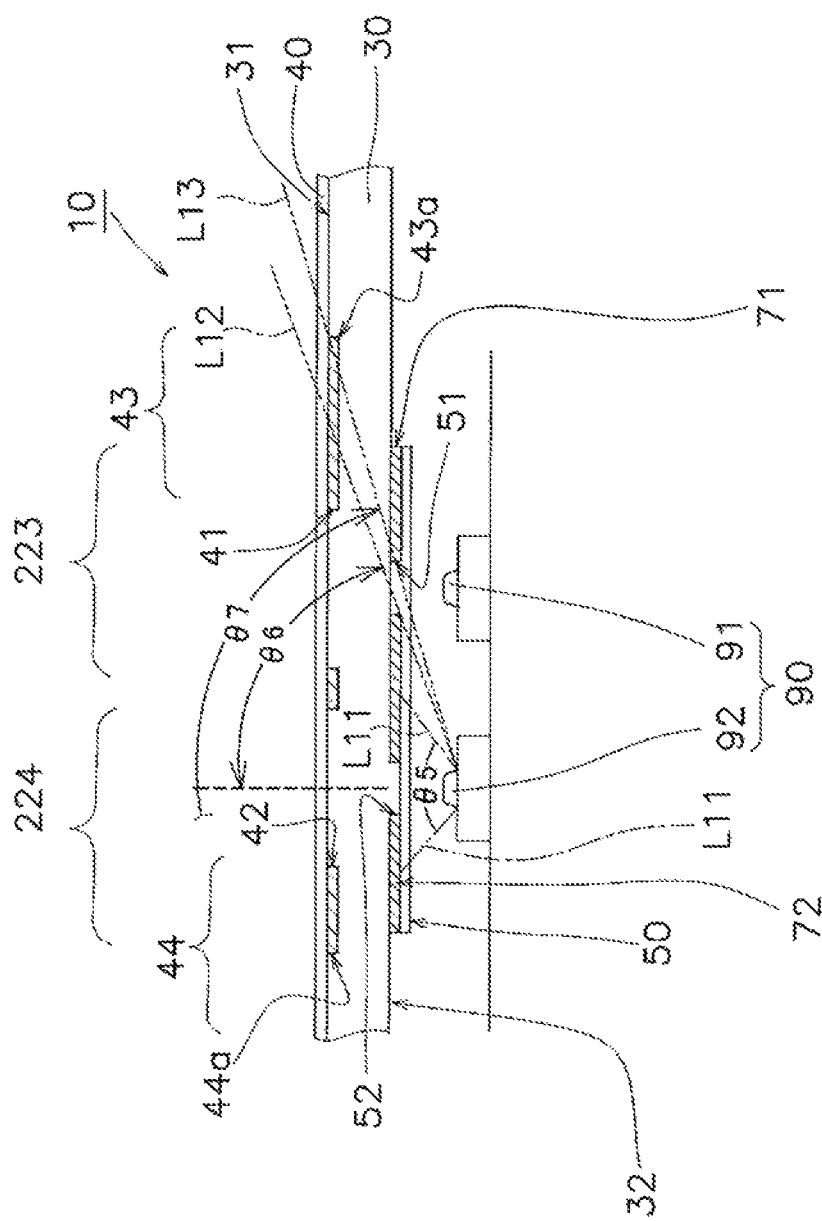
FIG. 16 is a schematic cross-sectional view illustrating a display panel according to a modification 1B.

FIG. 16 illustrates a range of illuminating angle $\theta 5$ defined by two straight lines L11, the range being irradiated with light emitted from the LED 92.

As illustrated in FIG. 16, under a condition satisfying the relationship, θ6>θ5/2, in which a straight line L12 connecting the first graphic 51 and the LED 92 is drawn outside a range within an illuminating angle θ5/2 of the LED 92, the first graphic 51 is not displayed by light directly emitted from the LED 92.

Even in a case where the LED 92 has a wide illuminating angle θ7 and the straight line L12 connecting the first graphic 51 and the LED 92 is drawn within a range within an illuminating angle θ7/2 of the LED 92 (in a case that the line L12 is drawn inside the straight line L13), i.e., the relationship, θ 6≤θ 7/2, is satisfied, the first graphic 51 is not displayed by light directly emitted from the LED 92 in a case that light having emitted from the LED 92 and having passed through the first graphic 51 is blocked by the first front-side light-shielding region 43. In other words, in a case that the first front-side light-shielding region 43 has the end 43*a* extending outside the range of the illuminating angle θ7, the first graphic 51 can be prevented from being displayed with light directly emitted. Note that indirect light emitted from the LED 92 and reflected from the front surface 31 of the molded body 30, which renders the first graphic 51 to be illuminated, is blocked by the second back-side light-shielding region 72.

In addition, even in a case where the end 43*a* of the first front-side light-shielding region 43 is out of an illuminating range of the LED 92 under a condition where the relationship, θ 6≤θ 7/2 is satisfied, the angle θ 6 of incidence of light emitted from the LED 92 to the front surface 31, being set to greater than the critical angle, allows the light to be reflected from the front surface 31. As a result, the first graphic 51 is not displayed by light that is directly emitted from the LED 92.

In a case that the first graphic 51 and the second graphic 52; the first window 41 and the second window 42; the first back-side light-shielding region 71 and the end 44*a* of the second front-side light-shielding region 44; and the second back-side light-shielding region 72 and the end 43*a* of the first front-side light-shielding region 43 are disposed to satisfy at least one of the conditions satisfying the respective three relationships described above, the first graphic 51 is prevented from being illuminated by the LED 92, and the second graphic 52 is prevented from being illuminated by the LED 91.

Note that, with reference to FIG. 16, there is described the configuration in which the first graphic 51 is prevented from being illuminated by the second back-side light-shielding region 72 and the first front-side light-shielding region 43 in a case that the second graphic 52 is illuminated in the second window 42 by the LED 92 that is turned on. Likewise, the configuration can be applied to the case where the second graphic 52 is prevented from being illuminated by the first back-side light-shielding region 71 and the second front-side light-shielding region 44 in a case that the first graphic 51 is illuminated in the first window 41 by the LED 91 that is turned on.

That is, it can be said that the display panel 10 is configured as follows: the display panel 10 is attached to an appliance including a first light source and a second light source, one of which is capable of being turned off in a case that the other is turned on, and is configured to transmit light emitted from the first light source and the second light source, and the display panel includes: a molded body that is light transmissive, is made of resin that is transparent or translucent, and includes a back surface with a protrusion that is a molded body made of the resin; a front-side decorative layer that is simultaneously integrated with a front surface of the molded body in a case that the molded body is molded and that decorates the front surface; and a sheet-like member that is simultaneously integrated with the back surface of the molded body in a case that the molded body is molded. The molded body or the sheet-like member includes a back-side decorative layer including a first graphic configured to be displayed with light from the first light source passing through the first graphic and the second graphic configured to be displayed with light from the second light source passing through the second graphic; the front-side decorative layer includes a first front-side light-shielding region configured to block light passing through a first window and light passing through a periphery of the first window, the first window being configured to allow light passing through the first graphic to pass through, and a second front-side light-shielding region configured to block light passing through a second window and light passing through a periphery of the second window, the second window being configured to allow light passing through the second graphic to pass through; the back-side decorative layer includes a first back-side light-shielding region configured to block light passing through a periphery of the first graphic and a second back-side light-shielding region configured to block light passing through a periphery of the second graphic; a whole range of an illuminating angle of the first light source is covered with the first back-side light-shielding region and the second front-side light-shielding region, except a portion through which light needs to pass, a portion reflected from the molded body, and a portion where light is blocked by another member; and a whole range of an illuminating angle of the second light source is covered with the second back-side light-shielding region and the first front-side light-shielding region, except a portion through which light needs to pass, a portion reflected from the molded body, and a portion where light is blocked by another member.

The portion through which light needs to pass is a transparent portion of the first graphic 51, for example, and the portion where light is blocked by another member is a portion blocked by the light-shielding member 70, for example.

(5-3) Modification 1C

Figure 17A:
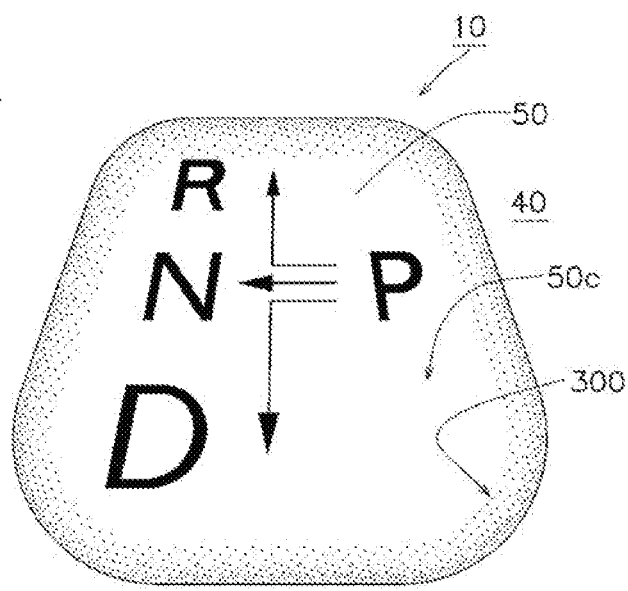
FIG. 17A is a partially enlarged perspective view of a display panel for illustrating gradation of light according to a modification 1C.

As illustrated in FIG. 17A, the display panel 10 may be configured such that a light gradation 300 appears on a front surface 50*c* of the back-side decorative sheet 50 by slightly changing the configuration of the display panel 10 of the first embodiment.

Figure 17B:
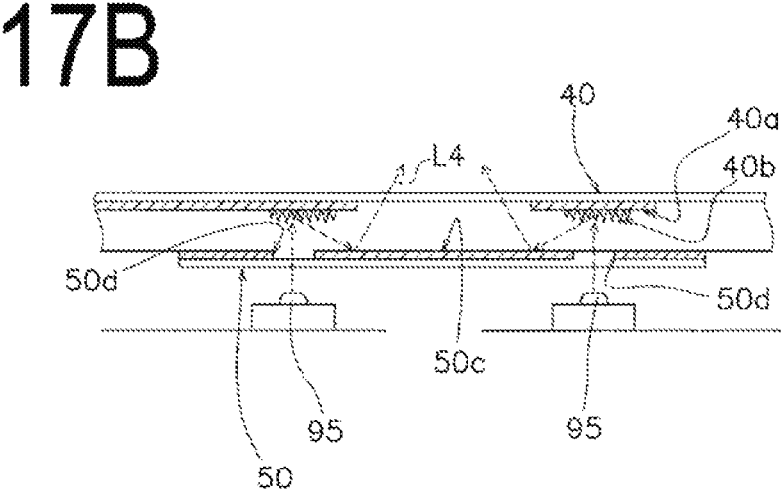
FIG. 17B is a partially enlarged cross-sectional view illustrating an example of structure of a display panel for displaying the gradation of light according to the modification 1C.

For example, as illustrated in FIG. 17B, a reflecting portion 40*b* configured to cause diffuse reflection is provided on a back surface 40*a* of a front-side decorative sheet 40. The back-side decorative sheet 50 is provided with an opening 50*d*. The back-side decorative sheet 50 is configured such that light of an LED 95 having passed through the opening 50*d* is reflected from the reflecting portion 40*b*, and that an optical path L4 of the reflected light extends toward the front surface 50*c* of the back-side decorative sheet 50. The reflected light is reduced with a distance from the reflecting portion 40*b* so that a gradation of light can appear on the front surface 50*c* of the back-side decorative sheet 50. The reflection from the reflecting portion 40*b* may be normal or diffuse.

(5-4) Modification 1D

Figure 18:
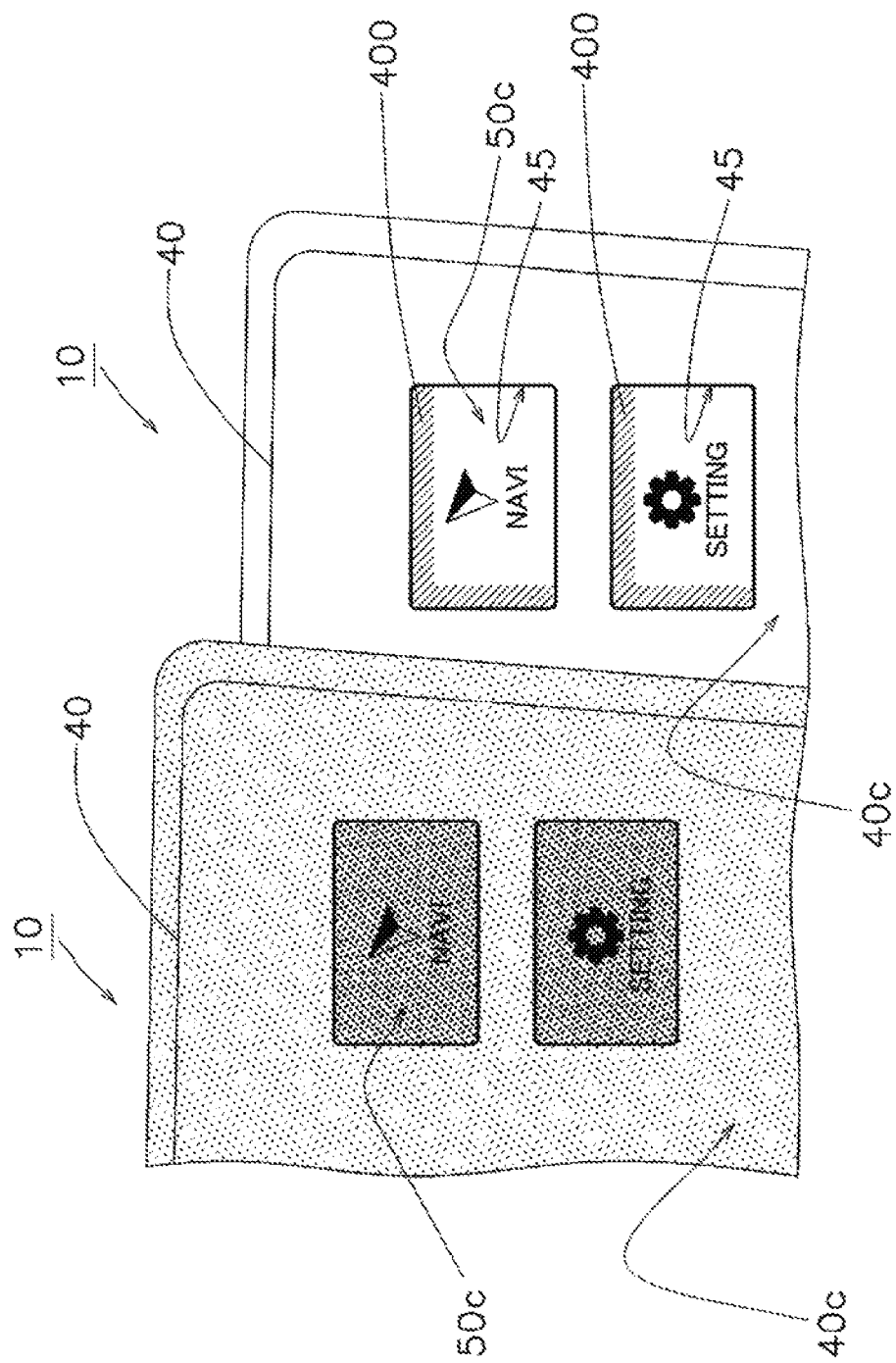
FIG. 18 is a partially enlarged perspective view for illustrating a shadow effect of a display panel according to a modification 1D.

FIG. 18 illustrated two types of display panel 10 side by side that are a black type in which a front surface 40*c* of the front-side decorative sheet 40 and the front surface 50c of the back-side decorative sheet 50 are black, and a white type in which the front surfaces of the decorative sheets are white. While in the black type, a shadow 400 visible in the white type is invisible so that the black type appears planar, a window 45 of the front-side decorative sheet 40 stereoscopically appears due to the presence of the shadow 400 in the white type. The representation of the window 45 described above may be applied to the first window 41 and/or the second window 42 of the first embodiment.

(5-5) Modification 1E

In the first embodiment described above, the structure of the first graphic 51 and the second graphic 52, and the periphery thereof are described. While in the first embodiment, only two graphics are described for the ease of illustration, the present disclosure may be applied to three or more graphics.

(5-6) Modification 1F

While in the first embodiment described above, there is described the case where the light-shielding member 70 surrounds the entire periphery of the light source 90 in a rectangular shape in a plan view, a method of blocking light by the light-shielding member 70 is not limited to the method of surrounding the entire periphery.

Figure 19A:
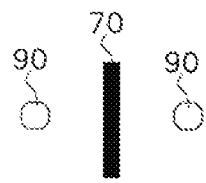
FIG. 19A is a schematic partially enlarged plan view illustrating an example of a planar shape of a light-shielding member according to a modification 1F.
Figure 19B:
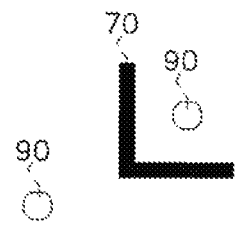
FIG. 19B is a schematic partially enlarged plan view illustrating another example of a planar shape of a light-shielding member according to the modification 1F.
Figure 19C:
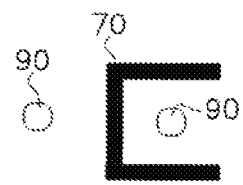
FIG. 19C is a schematic partially enlarged plan view illustrating yet another example of a planar shape of a light-shielding member according to the modification 1F.
Figure 19D:
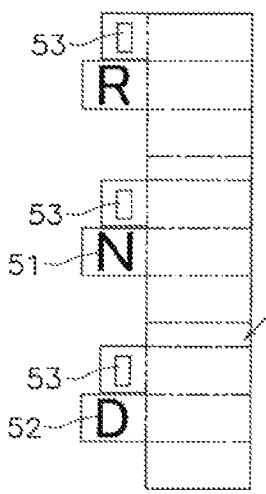
FIG. 19D is a plan view illustrating an example of a film piece for forming a light-shielding member according to the modification 1F.
Figure 19E:
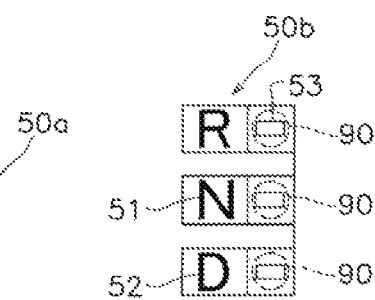
FIG. 19E is a plan view illustrating an example of an insert piece for forming a light-shielding member according to the modification 1F.

As illustrated in FIGS. 19A to 19C, the light-shielding member 70 may have a structure surrounding a part of the light source 90, such as an I-shape, an L-shape, and a C-shape, in a plan view. Accordingly, a shape of the insert piece is not limited to the shape illustrated in the first embodiment. For example, the light-shielding member 70 may be configured such that the film piece 50a formed by trimming the back-side decorative sheet 50 may be folded as illustrated in FIG. 19D, and one insert piece as illustrated in FIG. 19E surrounds the plurality of light sources 90. Note that FIG. 19D illustrates a dot-dash line that illustrates a mountain fold (folding in which a fold line projects like a mountain), and a two-dot chain line that illustrates a valley fold (folding in which a fold line is pulled like a valley).

(5-7) Modification 1G

Figure 20:
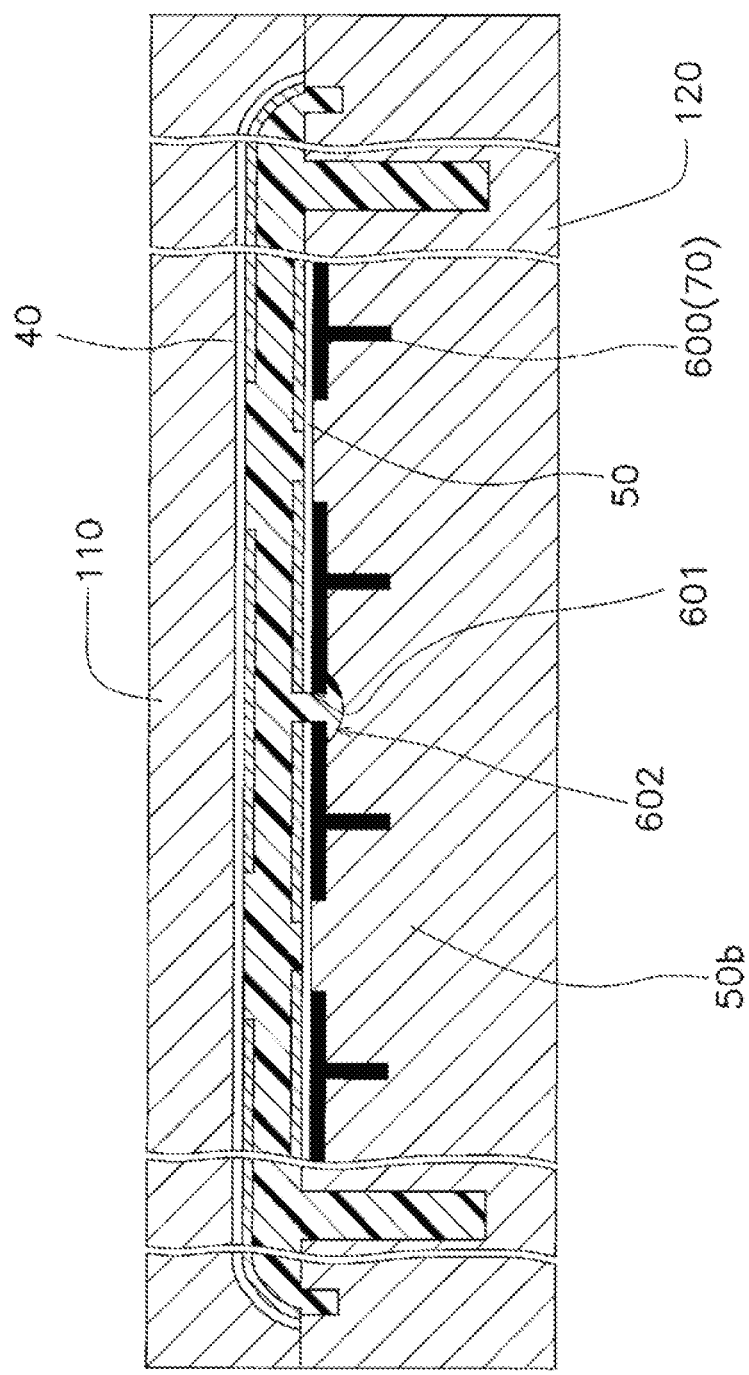
FIG. 20 is a schematic cross-sectional view of a first mold and a second mold for illustrating an example of a display panel according to a modification 1G.

In the first embodiment described above, there is described the case where the back-side decorative sheet 50 is pre-formed to form the insert piece 50b for forming the opaque light-shielding member 70. However, the third back-side light-shielding region 73 and the fourth back-side light-shielding region 74 each may be formed using another insert piece. As illustrated in FIG. 20, an insert piece 600 made of ceramic, metal, or resin, may be used, for example. A configuration is possible in which a hole 601 is formed in the insert piece 600 and the back-side decorative sheet 50, and resin of the molded body 30 is poured in the hole 60 to form a lock portion 602 such that the insert piece 600 is fastened to the display panel 10.

The light-shielding member 70 may also be formed by two-color molding using an opaque resin different from that used in the molded body 30 that is light transmissive.

(5-8) Modification 1H

Figure 21:
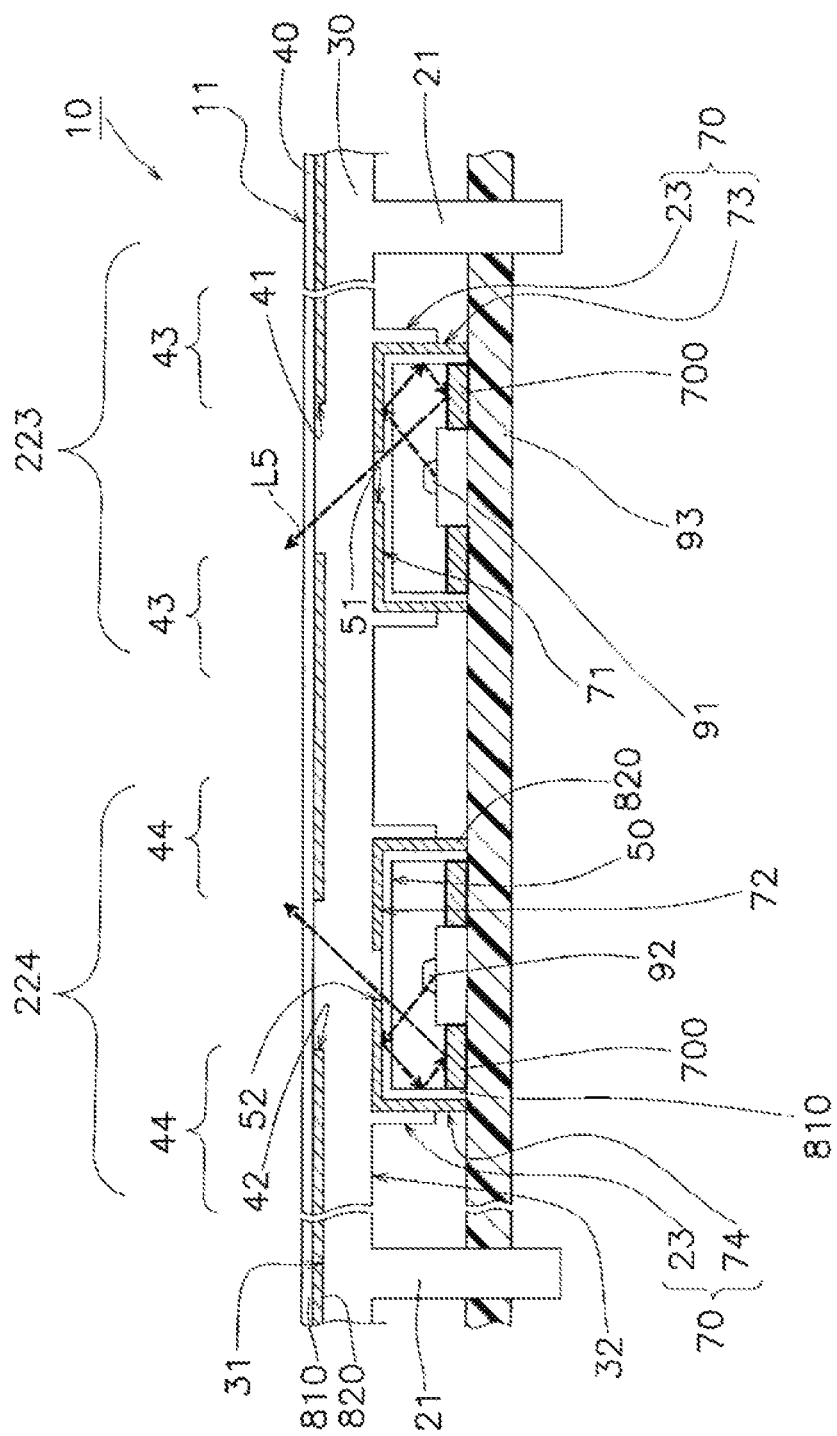
FIG. 21 is a schematic partially enlarged cross-sectional view illustrating an example of a display panel according to a modification 1H.

In the first embodiment, it is described that a reflecting portion may be formed in a portion from the first back-side light-shielding region 71 to the fourth back-side light-shielding region 74. In addition, as illustrated in FIG. 21, a reflector 700 may be disposed around each of the LEDs 91 and 92. As in an optical path L5 illustrated in FIG. 21, for example, there is reflected light that is sequentially reflected from a reflecting portion of the first back-side light-shielding region 71, from a reflecting portion of the third back-side light-shielding region 73, and from the reflector 700, to be emitted outward from the display panel 10. Likewise, there is reflected light that is sequentially reflected from a reflecting portion of the second back-side light-shielding region 72, from a reflecting portion of the fourth back-side light-shielding region 74, and from the reflector 700, to be emitted outward from the display panel 10. As described above, in a case that the reflecting portion and/or the reflector 700 is used, the first graphic 51 and the second graphic 52 can be displayed brighter compared to a case without the reflecting portion and the reflector 700.

(5-9) Modification 1J

In the first embodiment described above, there is described the case where the insert piece 50b is formed by preforming the film piece 50a of the back-side decorative sheet 50. However, a preforming step may be eliminated, and the film piece 50a may be folded by pressure of molten resin 130 during injection molding.

(5-10) Modification 1K

While in each of the first embodiment and the modifications 1A to 1J described above, there is described the case where the plurality of light sources 90 are the LEDs 91 and 92, the light source 90 is not limited to an LED, and thus the light source 90 may be an incandescent lamp source and/or a light guide plate; or a combination of a plurality of types of light source, for example.

(5-11) Modification 1L

While in the first embodiment and the modifications 1A to 1K described above, there is described the case where the display panel 10 is used in the center console 200 of an automobile, an application of the display panel 10 is not limited to the center console 200 of an automobile.

(6) Features 6-1

The display panel 10 of each of the first embodiment and the modifications 1A to 1H is attached to the printed circuit board 93 that is an appliance including the LEDs 91 and 92, one of which is capable of being turned off in a case that the other is turned on, for example. The LEDs 91 and 92 are examples of the first light source and the second light source, respectively. The molded body 30 being light transmissive is made of a transparent or translucent resin through which light emitted from the LEDs 91 and 92 passes. The molded body 30 is provided on the back surface 32 with a protrusion 20 that is a molded body made of resin. The boss 21 and the rib 22 are each an example of the projection 20. The protrusion 20 is large enough to interfere with simultaneous integrated molding of the back-side decorative sheet 50 and/or the sensor sheet 60, and a protrusion such as the convex surface 33 illustrated in FIG. 8B, having a small size to allow the back-side decorative sheet 50 and/or the sensor sheet 60 to conform to the size during injection molding, for example, is not equivalent to the protrusion 20 in the present disclosure.

The front-side decorative sheet 40 is an example of the front-side decorative layer that is simultaneously integrated with the front surface 31 of the molded body 30 in a case that the molded body 30 is molded and that decorates the front surface 31.

The back-side decorative sheet 50 is an example of the sheet-like member that is simultaneously integrated with the back surface 32 of the molded body 30 in a case that the molded body 30 is molded. The sensor sheet 60 is also an example of the sheet-like member.

In the first embodiment, the back-side decorative sheet 50 is an example of the back-side decorative layer including the first graphic 51 displayed by the transmission of light from the first light source (LED 91) and the second graphic 52 displayed by the transmission of light from the second light source (LED 92).

The front side decorative sheet 40 includes: the screen region 48 that obscures the protrusion 20; the first front-side light-shielding region 43 that blocks light passing through the first window 41 and the light passing through the periphery of the first window 41, the first window 41 being configured to allow light passed through the first graphic 51 to pass through; and the second front-side light-shielding region 44 that blocks light passing through the second window 42 and the light passing through the periphery of the second window 42, the second window 42 being configured to allow light passed through the second graphic 52 to pass through.

The back-side decorative sheet 50 includes the first back-side light-shielding region 71 that blocks light passing through the periphery of the first graphic 51; and the second back-side light-shielding region 72 that blocks light passing through the periphery of the second graphic 52.

In a case that, in the display panel 10, the first graphic 51 (e.g., the character, "N") is illuminated in green in the first window 41, for example, by the LED 91 that is turned on, the first back-side light-shielding region 71 and the second front-side light-shielding region 44 prevent the second graphic 52 from being illuminated in green. In a case that the, in the display panel 10, the second graphic 52 (e.g., the character, "D") is illuminated in white in the second window 42, for example, by the LED 92 that is turned on, the second back-side light-shielding region 72 and the first front-side light-shielding region 43 prevent the first graphic 51 from being illuminated in white.

In other words, preventing the second graphic 52 from being illuminated using the first back-side light-shielding region 71 and the second front-side light-shielding region 44 in a case that the first graphic 51 is illuminated in the first window 41 by the LED 91 that is turned on means that direct and indirect light emitted from the LED 91 to the outside through the second graphic is reduced compared to a case without the first back-side light-shielding region 71 and the second front-side light-shielding region 44.

To reduce direct and indirect light emitted from the LED 91 to the outside through the second graphic 52, at least one of the first back-side light-shielding region 71 and the second front-side light-shielding region 44 may be disposed within a range of the illuminating angle of the LED 91, for example. It is preferable that a whole range of an illuminating angle of the LED 91 is covered with the first back-side light-shielding region 71 and the second front-side light-shielding region 44 except a portion through which light needs to pass, a portion reflected from the molded body 30, and a portion where light is blocked by another member (e.g., the light-shielding member 70). In addition, to reduce indirect light, it is preferable that at least one of the first back-side light-shielding region 71 and the second front-side light-shielding region 44 is in a color absorbing light, such as black.

Likewise, preventing the first graphic 51 from being illuminated using the second back-side light-shielding region 72 and the first front-side light-shielding region 43 in a case that the second graphic 52 is illuminated in the second window 42 by the LED 92 that is turned on means that direct and indirect light emitted from the LED 92 to the outside through the first graphic is reduced compared to a case without the second back-side light-shielding region 72 and the first front-side light-shielding region 43.

To reduce direct and indirect light emitted from the LED 92 to the outside through the first graphic 51, at least one of the second back-side light-shielding region 72 and the first front-side light-shielding region 43 may be disposed within a range of the illuminating angle of the LED 92, for example. It is preferable that a whole range of an illuminating angle of the LED 92 is covered with the second back-side light-shielding region 72 and the first front-side light-shielding region 43 except a portion through which light needs to pass, a portion reflected from the molded body 30, and a portion where light is blocked by another member (e.g., the light-shielding member 70). In addition, to reduce indirect light, it is preferable that at least one of the second back-side light-shielding region 72 and the first front-side light-shielding region 43 is in a color absorbing light, such as black.

As described above, the first graphic 51 and the second graphic 52 can be prevented from being simultaneously and similarly illuminated by turning on the LED 91 or the LED 92, and light emitted from the LED 91 or the LED 92 and having passed through the molded body 30 being light transmissive can individually illuminate the first graphic 51 or the second graphic 52, which is decorated simultaneously with molding of the molded body 30.

Figure 22:
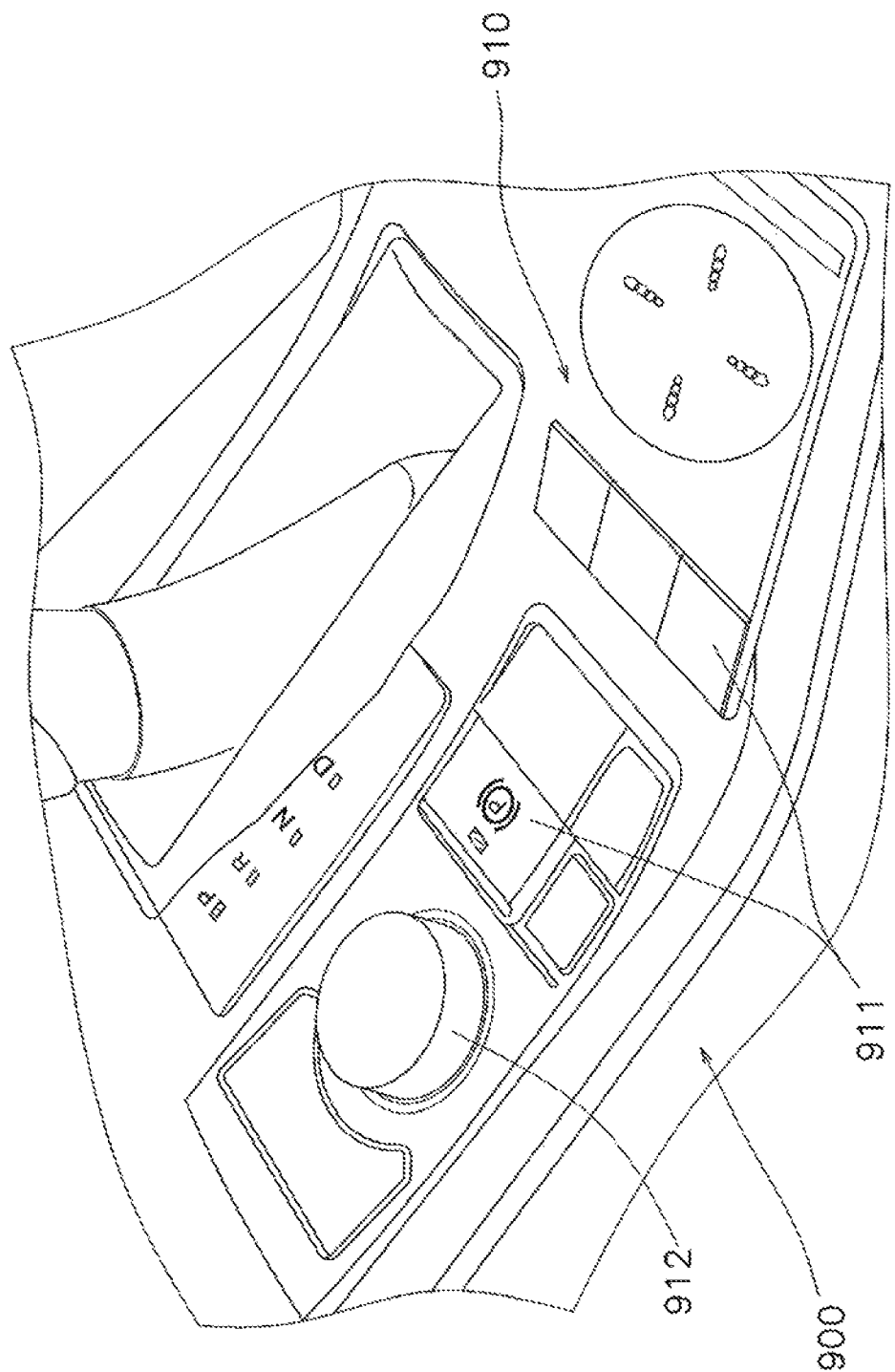
FIG. 22 is a perspective view for illustrating a display panel used in a conventional center console.

For example, a display panel 910 of a conventional center console 900 as illustrated in FIG. 22 may include operational components, such as a push button 911 and a volume knob 912, incorporated therein. It is cumbersome to clean the display panel 910 in a case that dust accumulates in a gap between the operational components. In contrast, the front surface 11 of the display panel 10 integrated by simultaneous molding and decoration has a seamless and continuous structure without a gap. As a result, the center console 200 configured using the seamless display panel 10, for example, is easily cleaned and enables its appearance to be aesthetically finished.

6-2

The light-shielding member 70 is fixed to the back surface 32 of the molded body 30 by simultaneous molding and decoration. Having the structure described above prevents a gap between the light-shielding member 70 and the molded body 30 from being formed, and thus prevents a failure such as light leaking through the gap in a case that the light-shielding member 70 blocks light emitted from the LED 91 toward the second graphic 52 and light emitted from the LED 92 toward the first graphic 51. As a result, the light emitted from the LED 91 toward the second graphic 52 and the light emitted from the LED 92 toward the first graphic 51 can be sufficiently blocked. In addition, the light-shielding member 70 can be attached to the display panel 10 by a single molding so that the display panel 10 including the light-shielding member 70 can be inexpensively provided.

6-3

The light-shielding member 70 of the first embodiment includes the back-side decorative sheet 50 printed with the first graphic 51 and the second graphic 52. In a case that the light-shielding member 70 is formed using the back-side decorative sheet 50, a mold for molding the light-shielding member 70 and the like can be eliminated to enable the light-shielding member 70 to be formed inexpensively.

6-4

The resin wall 23 of the first embodiment is an example of the support portion that protrudes from the back surface 32 and supports the third back-side light-shielding region 73 and the fourth back-side light-shielding region 74 each constituting the light-shielding member 70 of the back-side decorative sheet 50. The resin wall 23 is a molded body made of a resin of the molded body 30. The back side decorative sheet 50 in a portion of the light-shielding member 70, protruding to the back side, is supported by the resin wall 23 so that the portion is less likely to be broken by an impact applied from the outside. As a result, handling of the display panel 10 can be facilitated during assembly of the center console 200, for example, and the display panel 10 can maintain good durability after the assembly.

6-5

As described in the first embodiment and the modification 1H, the reflecting portion is provided in a part or all of the light-shielding member 70, particularly in portions facing the respective LEDs 91 and 92 so that the amount of light emitted from the first graphic 51 and/or the second graphic 52 to the outside can be increased compared to a case without the reflecting portion that reflects light from the LEDs 91 and 92. In addition, as described in the modification 1C, in a case that the reflecting portion 40b is provided in the front-side decorative sheet 40 serving as the front-side decorative layer, the front-side decorative sheet 40 can be illuminated having a change in light representation such as light gradation.

6-6

The sensor sheet 60 is disposed in a region different from the back-side decorative sheet 50 including the first graphic 51 and the second graphic 52. The touch pad 212 and the touch switch 213 formed using the sensor sheet 60 allow a user such as a driver to input various kinds of information from the front surface 31 of the molded body 30, i.e., from the front surface 11 of the display panel 10. Thus, the seamless display panel 10 allows various kinds of information from the front surface 11 to be input.

6-7

The first window 41 and the second window 42 are disposed such that the angle formed by the straight line connecting the first graphic 51 and the edge 41a of the first window 41 and the normal line with respect to the front surface 31 of the molded body 30 and the angle formed by the straight line connecting the second graphic 52 and the edge 42a of the second window 42 and the normal line are each greater than the critical angle. Accordingly, light incident into the first window 41 from the LED 91, at an angle of incidence less than the critical angle, and light incident into the second window 42 from the LED 92, at an angle of incidence less than the critical angle, are all emitted outward. As a result, a wide viewing angle is obtained for the first graphic 51 and the second graphic 52.

6-8

The front-side decorative sheet 40 includes the first window 41 and the second window 42 that are disposed such that light reaching the first window 41 from the end 71a of the first back-side light-shielding region 71 and light reaching the second window 42 from the end 72a of the second back-side light-shielding region 72 are each incident on the front surface 31 of the molded body 30 at an angle greater than the critical angle. Accordingly, light emerged from the end 71a of the first back-side light-shielding region 71, from the end 72a of the second back-side light-shielding region 72, and from the protrusion 20, is not emitted to the outside so that these structures on the back surface 12 side of the display panel 10 can be prevented from being visible from the first window 41 and the second window 42.

6-9

The molded body 30 includes the protrusion or the recess like the convex surface 33, the concave surface 34, and the inclined surface 35, which refract light emerged from the first window 41 and/or the second window 42 so that the display panel 10 can provide a display to be easily viewed by a user such as a driver by refracting and spreading light emerged from the first graphic 51 and/or the second graphic 52 or changing an optical path of the light.

6-10

Figure 10B:
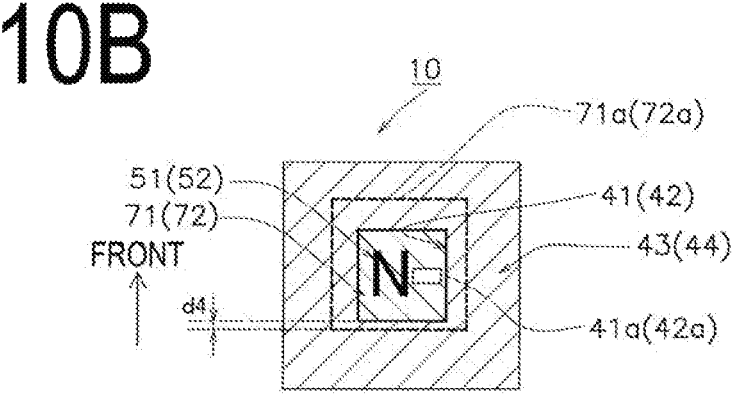
FIG. 10B is a partially enlarged plan view of the display panel for illustrating the placement of the first window and the second window of a center console.

As described with reference to FIG. 10B, the display panel 10 attached to the center console 200 of an automobile is configured such that in a plan view, the distance d4 from the edge 41a of the first window 41 to the end 71a of the first back-side light-shielding region 71 and the distance d4 from the edge 42a of the second window 42 to the end 72a of the second back-side light-shielding region 72 are minimum on a rear side in the traveling direction of the automobile. This structure allows the first graphic 51 and the second graphic 52 to be easily disposed side by side in the traveling direction of the automobile, for example.

Second Embodiment

Figure 23:
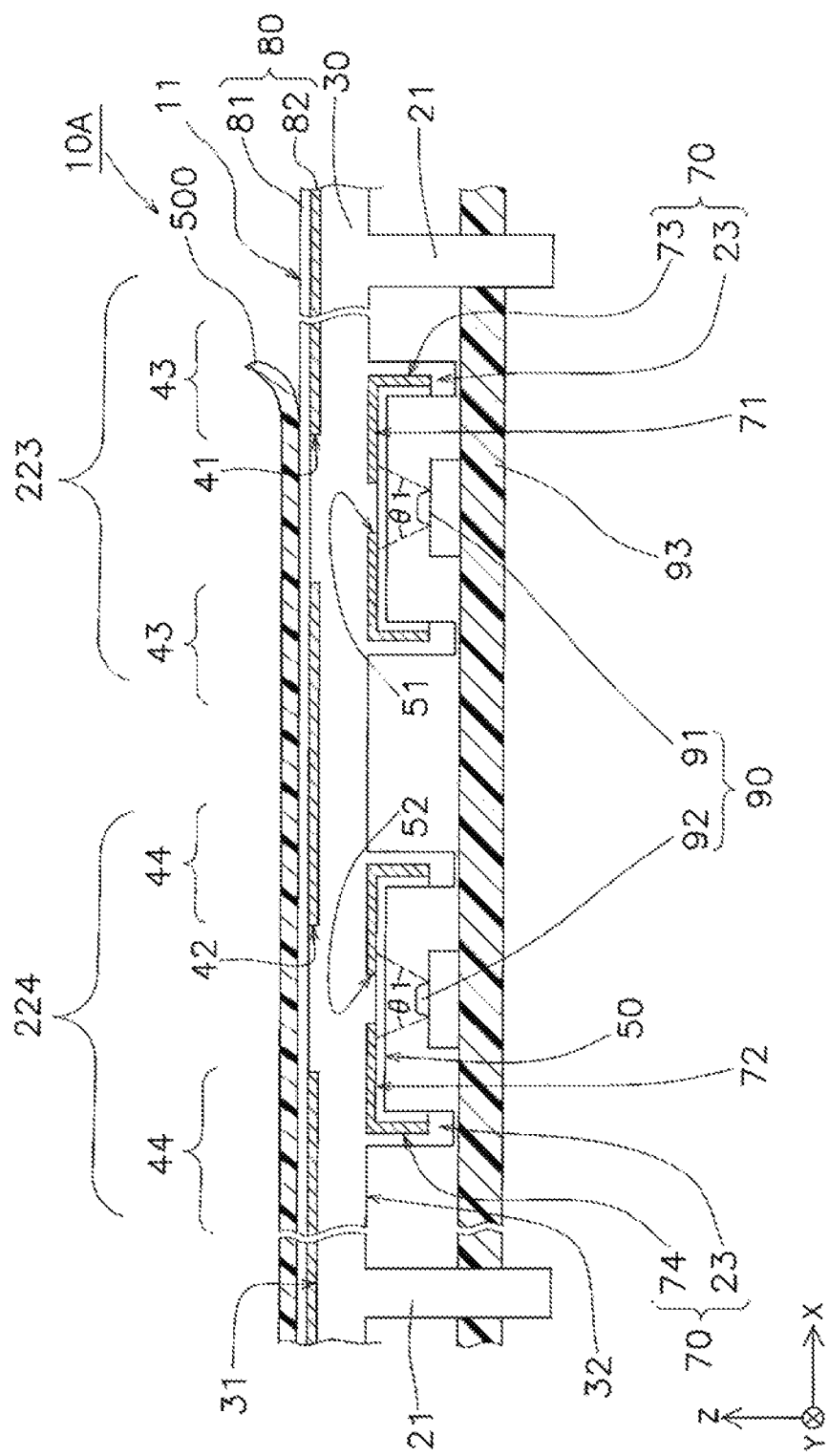
FIG. 23 is a schematic partially enlarged cross-sectional view of a display panel according to a second embodiment.

While in the first embodiment described above, there is described the case where the front-side decorative layer is formed using the front-side decorative sheet 40, the front-side decorative layer may be formed by a transfer layer. FIG. 23 illustrates a display panel 10A that is formed using a transfer layer instead of the front-side decorative sheet 40.

A transfer layer 80 is formed on a base film 500. Even in a case where the transfer layer 80 is formed, the transfer layer 80 is disposed in the first mold 110 and the second mold 120, together with the base film 500 instead of the front-side decorative sheet 40, as in the case where the front-side decorative sheet 40 is used. The transfer layer 80 is then integrated with the molded body 30 by injection molding. The base film 500 is peeled off from the display panel 10A after the injection molding.

The base film 500 can be made of synthetic resin such as a polyester-based resin, a polypropylene-based resin, an acrylic-based resin, a polycarbonate-based resin, a polyamide-based resin, a polyimide-based resin, an olefin-based resin, a urethane-based resin, or an acrylonitrile butadiene styrene-based resins.

As illustrated in FIG. 23, the transfer layer 80 includes a design ink layer 81 for the first front-side light-shielding region 43 and the second front-side light-shielding region 44, and a top coat layer 82 for protecting the design ink layer 81.

The design ink layer 81 is also used to decorate an appearance of the display panel 10. As a material of the transfer layer 80, there is available thermoplastic resin, such as a thermoplastic urethane resin, an acrylic-based resin, and a vinyl chloride vinyl acetate copolymer resin. Alternatively, thermosetting resin such as an acrylic urethane resin, a polyester urethane resin, and a urea melamine resin; or an ink using an ultraviolet curing resin or a thermoplastic resin as a binder can be used.

Examples of a material of the top coat layer 82 include UV curable and ionizing radiation curable resin such as polyester acrylate or urethane acrylate and thermosetting resin such as acrylic-based or urethane-based. The transfer layer 80 described above may include other layers such as a peeling layer, an adhesive layer, and an anchor layer.

Each of the layers described above can be formed by a printing method, such as a gravure printing method, a screen printing method, or an offset printing method; or a coating method, such as a gravure coating method, a die coating method, a roll coating method, or a comma coating method, for example.

Even the display panel 10A of the second embodiment can be modified as in the modifications described for the display panel 10 of the first embodiment. The display panel 10A of the second embodiment also achieves similar effects to those of the first embodiment.

The invention claimed is:

1. A display panel attached to an appliance including a first light source and a second light source, one of which is capable of being turned off in a case that the other is turned on, and configured to transmit light emitted from the first light source and the second light source, the display panel comprising:
    a molded body that is light transmissive, is made of resin that is transparent or translucent, and includes a back surface with a protrusion that is a molded body made of the resin;
    a front-side decorative layer that is simultaneously integrated with a front surface of the molded body in a case that the molded body is molded and that decorates the front surface; and
    a sheet-like member that is simultaneously integrated with the back surface of the molded body in a case that the molded body is molded,
    wherein the molded body or the sheet-like member includes a back-side decorative layer including a first graphic configured to be displayed with light from the first light source passing through the first graphic and a second graphic configured to be displayed with light from the second light source passing through the second graphic,
    the front-side decorative layer includes a first front-side light-shielding region configured to block light passing through a first window and light passing through a periphery of the first window, the first window being configured to allow light passing through the first graphic to pass through, and a second front-side light-shielding region configured to block light passing through a second window and light passing through a periphery of the second window, the second window being configured to allow light passing through the second graphic to pass through,
    the back-side decorative layer includes a first back-side light-shielding region configured to block light passing through a periphery of the first graphic and a second back-side light-shielding region configured to block light passing through a periphery of the second graphic, and
    the second graphic is prevented from being illuminated by the first back-side light-shielding region and the second front-side light-shielding region in a case that the first graphic is illuminated in the first window by the first light source that is turned on, and the first graphic is prevented from being illuminated by the second back-side light-shielding region and the first front-side light-shielding region in a case that the second graphic is illuminated in the second window by the second light source that is turned on.

2. The display panel according to claim 1, further comprising:
    a light-shielding member fixed to the back surface of the molded body and configured to block light emitted from the first light source toward the second graphic and light emitted from the second light source toward the first graphic.

3. The display panel according to claim 2, wherein the light-shielding member includes a back-side decorative sheet in which at least one of the first graphic and the second graphic is printed on the sheet-like member.

4. The display panel according to claim 3, wherein the molded body further includes a support portion that is a molded body made of the resin, protrudes from the back surface, and supports a portion of the back side decorative sheet constituting the light-shielding member.

5. The display panel according to claim 2, wherein the light-shielding member and/or the front-side decorative layer includes a reflecting portion configured to reflect light emitted from the first light source and/or the second light source at at least a portion of the light-shielding member and/or the front-side decorative layer.

6. The display panel according to claim 2, wherein the sheet-like member includes a sensor sheet disposed in a region different from the first graphic and the second graphic and configured to receive input from the front surface of the molded body.

7. The display panel according to claim 2, wherein the first window and the second window are disposed having an angle formed by a straight line connecting the first graphic and an edge of the first window and a normal line with respect to the front surface of the molded body; and an angle formed by a straight line connecting the second graphic and an edge of the second window and the normal line, the angles each being greater than a critical angle.

8. The display panel according to claim 2, wherein the front-side decorative layer includes the first window and the second window that are disposed such that light reaching the first window and the second window from an end of the first back-side light-shielding region, from an end of the second back-side light-shielding region, and from the protrusion is incident on the front surface of the molded body at an angle greater than the critical angle.

9. The display panel according to claim 2, wherein the molded body includes a protrusion or a recess configured to refract light emitted through the first window and/or the second window.

10. The display panel according to claim 2, wherein the appliance constitutes a center console of an automobile, and
the front-side decorative layer is configured such that a distance from each of the edge of the first window and the edge of the second window to the corresponding one of the end of the first back-side light-shielding region and the end of the second back-side light-shielding region in a plan view is minimum on a rear side in a traveling direction of an automobile.

11. The display panel according to claim 1, wherein the sheet-like member includes a sensor sheet disposed in a region different from the first graphic and the second graphic and configured to receive input from the front surface of the molded body.

12. The display panel according to claim 1, wherein the first window and the second window are disposed having an angle formed by a straight line connecting the first graphic and an edge of the first window and a normal line with respect to the front surface of the molded body; and an angle formed by a straight line connecting the second graphic and an edge of the second window and the normal line, the angles each being greater than a critical angle.

13. The display panel according to claim 1, wherein the front-side decorative layer includes the first window and the second window that are disposed such that light reaching the first window and the second window from an end of the first back-side light-shielding region, from an end of the second back-side light-shielding region, and from the protrusion is incident on the front surface of the molded body at an angle greater than the critical angle.

14. The display panel according to claim 1, wherein the molded body includes a protrusion or a recess configured to refract light emitted through the first window and/or the second window.

15. The display panel according to claim 1, wherein the appliance constitutes a center console of an automobile, and
the front-side decorative layer is configured such that a distance from each of the edge of the first window and the edge of the second window to the corresponding one of the end of the first back-side light-shielding region and the end of the second back-side light-shielding region in a plan view is minimum on a rear side in a traveling direction of an automobile.

* * * * *